(12) United States Patent
Wittig

(10) Patent No.: US 10,952,551 B2
(45) Date of Patent: Mar. 23, 2021

(54) DEVICE FOR STORING PIECE GOODS AND ASSOCIATED METHOD

(71) Applicant: WÜRTH INTERNATIONAL AG, Chur (CH)

(72) Inventor: Klaus Wittig, Öhringen (DE)

(73) Assignee: WÜRTH INTERNATIONAL AG, Chur (CH)

( * ) Notice: Subject to any disclaimer, the term of this patent is extended or adjusted under 35 U.S.C. 154(b) by 444 days.

(21) Appl. No.: 16/080,640

(22) PCT Filed: Nov. 18, 2016

(86) PCT No.: PCT/DE2016/000404
§ 371 (c)(1),
(2) Date: Feb. 4, 2019

(87) PCT Pub. No.: WO2017/084649
PCT Pub. Date: May 26, 2017

(65) Prior Publication Data
US 2019/0150639 A1     May 23, 2019

(30) Foreign Application Priority Data
Nov. 18, 2015    (DE) ..................... 10 2015 120 000.7

(51) Int. Cl.
*A47F 10/02*      (2006.01)
*G06Q 10/08*      (2012.01)
(Continued)

(52) U.S. Cl.
CPC ............ *A47F 10/02* (2013.01); *A47B 88/969* (2017.01); *A47F 5/16* (2013.01); *A47F 7/28* (2013.01);
(Continued)

(58) Field of Classification Search
CPC ................ G06Q 10/087; G06Q 20/203; A47F 2010/025; A47F 10/02; A47F 5/16;
(Continued)

(56) References Cited

U.S. PATENT DOCUMENTS 4,866,661 A    9/1989   De Prins
5,328,169 A    7/1994   Mandel
(Continued)

FOREIGN PATENT DOCUMENTS

AT         502 332 A1    3/2007
DE        41 41 468 A1    6/1993
(Continued)

OTHER PUBLICATIONS

International Search Report of corresponding PCT/DE2016/000404, dated Apr. 18, 2017, 2 pages.
(Continued)

*Primary Examiner* — Timothy R Waggoner
(74) *Attorney, Agent, or Firm* — Lewis Roca Rothgerber Christie LLP

(57) ABSTRACT

Device for storing piece goods, in particular a shelf unit or a cupboard, having at least one shelf, which has an upper side, on which the piece good is storable in a surveillance space, and a lower side and openings, which run from the upper side to the lower side, as well as signal transmitting devices having associated signal receiving devices, wherein at least one type of the devices is arranged in the openings at the lower side, and a signal of the signal transmitting devices is detectable by the signal receiving devices, as well as a control electronics having a control system, which energize the signal transmitting devices and the signal receiving devices and process the signals of the signal receiving devices and identify them, so as to identify an occupancy state of the surveillance space with piece goods (Continued)

Figure 1:
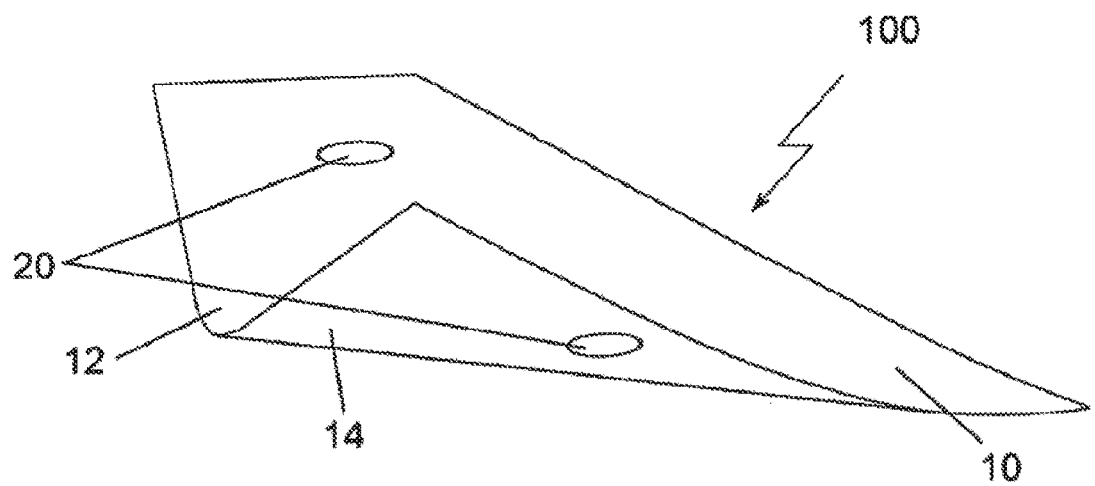

on the basis of the existence of a signal at the respective signal receiving device.

15 Claims, 22 Drawing Sheets

(51) Int. Cl.
*A47B 88/969* (2017.01)
*A47F 5/16* (2006.01)
*A47F 7/28* (2006.01)
*B25H 3/02* (2006.01)

(52) U.S. Cl.
CPC ............ *B25H 3/02* (2013.01); *G06Q 10/087* (2013.01); *A47F 2005/165* (2013.01); *A47F 2010/025* (2013.01)

(58) Field of Classification Search
CPC ..... A47F 7/28; A47F 2005/165; B65G 1/137; A47B 88/969
USPC .................................................. 700/231–244
See application file for complete search history.

(56) References Cited

U.S. PATENT DOCUMENTS

| | | | | |
|---|---|---|---|---|
| 5,671,362 | A * | 9/1997 | Cowe | G06Q 10/087 340/5.92 |
| 5,728,999 | A * | 3/1998 | Teicher | G06Q 20/04 235/381 |
| 6,039,467 | A | 3/2000 | Holmes | |
| 6,116,461 | A | 9/2000 | Broadfield et al. | |
| 8,695,878 | B2 * | 4/2014 | Burnside | G06K 19/06028 235/385 |
| 2005/0168345 | A1 | 8/2005 | Swafford, Jr. et al. | |
| 2006/0164247 | A1 * | 7/2006 | Overhultz | A47F 10/02 340/572.1 |
| 2007/0016494 | A1 * | 1/2007 | Brown | G06Q 10/087 705/28 |
| 2008/0065264 | A1 | 3/2008 | Omura et al. | |
| 2008/0103939 | A1 | 5/2008 | Gibb | |
| 2009/0319399 | A1 * | 12/2009 | Resta | G06Q 10/00 705/28 |
| 2014/0316916 | A1 * | 10/2014 | Hay | A47F 9/048 705/17 |
| 2017/0185952 | A1 * | 6/2017 | Albertus | G06Q 20/203 |
| 2017/0220987 | A1 * | 8/2017 | Sun | A47F 10/02 |
| 2018/0306958 | A1 * | 10/2018 | Goss | A47F 10/02 |
| 2020/0167719 | A1 * | 5/2020 | Hohl | A47F 5/0043 |

FOREIGN PATENT DOCUMENTS

| | | |
|---|---|---|
| DE | 197 14 799 A1 | 10/1998 |
| DE | 10 2005 039 781 A1 | 7/2006 |
| DE | 10 2005 037 490 A1 | 2/2007 |
| DE | 10 2007 017 207 A1 | 2/2008 |
| EP | 1 752 795 A2 | 2/2007 |
| EP | 2 199 999 A1 | 6/2010 |
| EP | 2 312 919 A1 | 4/2011 |
| WO | WO 2014/124612 A2 | 8/2014 |
| WO | WO 2015/100324 A1 | 7/2015 |

OTHER PUBLICATIONS

English translation of Written Opinion of corresponding PCT/DE2016/000404, dated Apr. 2017, 4 pages.
Search Report of corresponding DE 10 2015 120 000.7, dated Jul. 29, 2016, 9 pages.

* cited by examiner

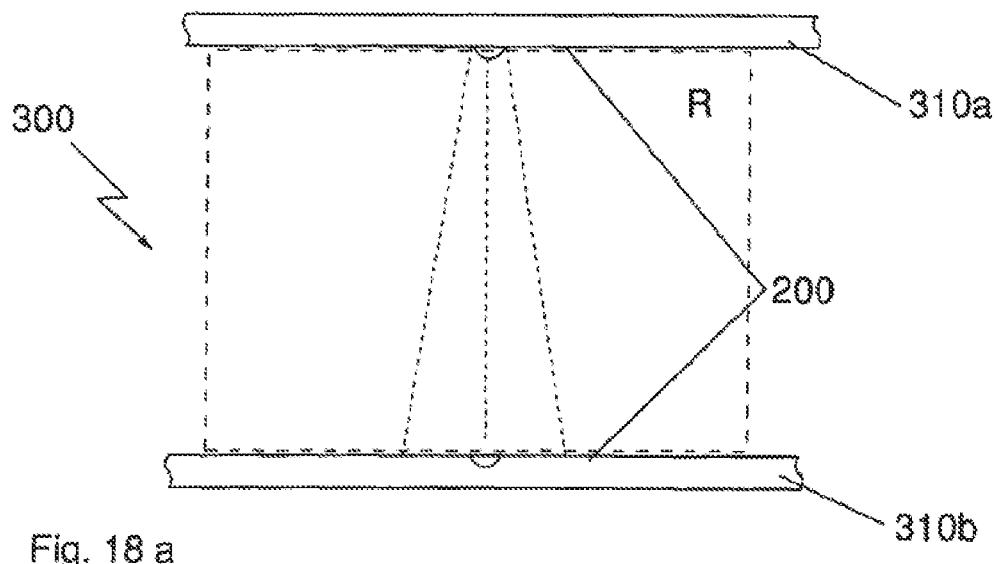
Fig. 18 a
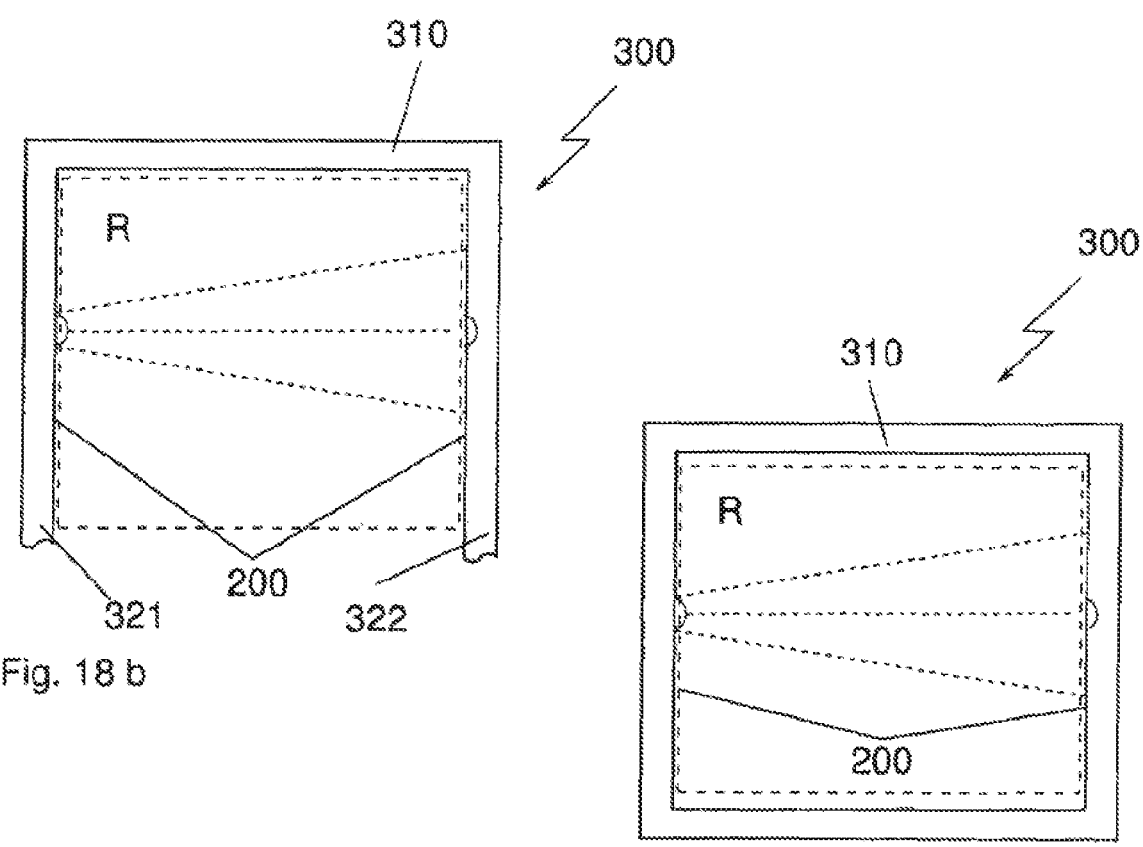
Fig. 18 b
Fig. 18 c

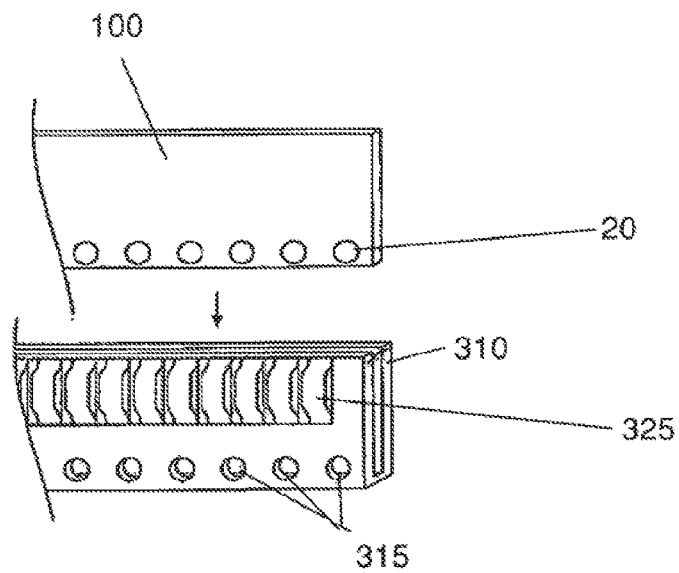
Fig. 28 a
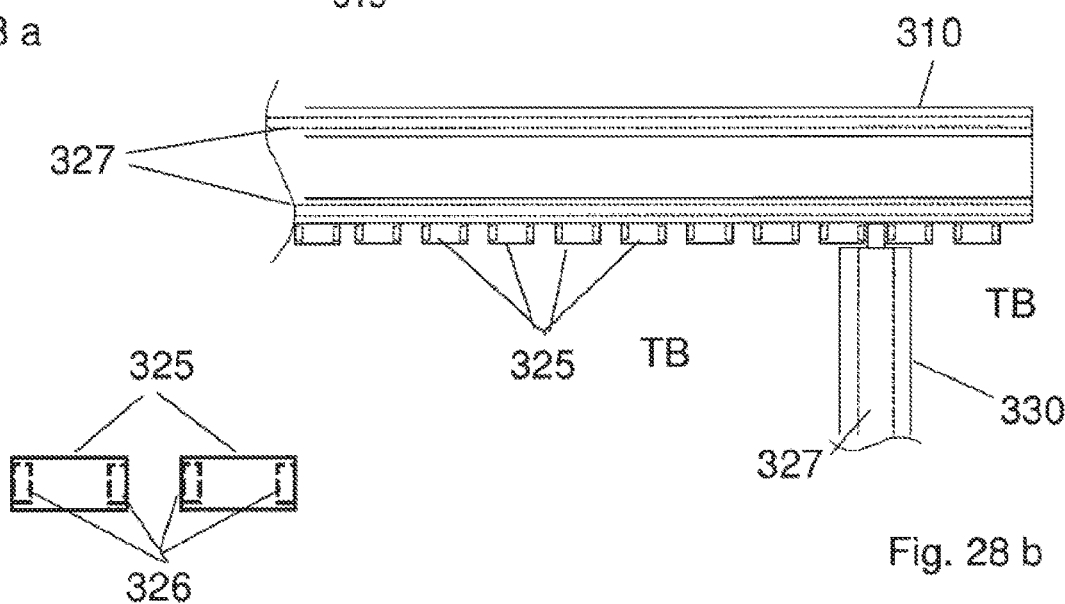
Fig. 28 b
Fig. 28 c
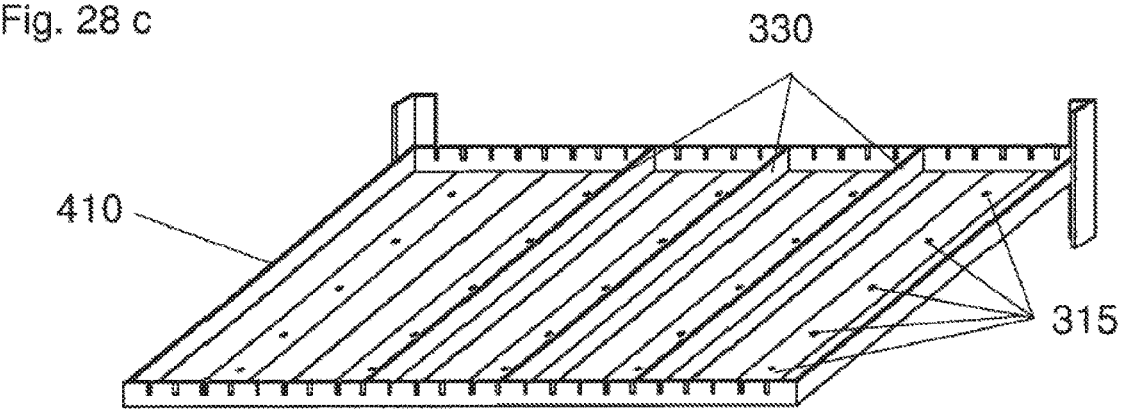
Fig. 29

DEVICE FOR STORING PIECE GOODS AND ASSOCIATED METHOD

This application is a national phase patent application derived from the international patent application no. PCT/DE2016/000404, and claims the benefit of the filing date of the German patent application no. DE 10 2015 120 000.7 filed on Nov. 18, 2015, the disclosures of which are hereby incorporated herein by reference.

FIELD OF THE INVENTION

The invention relates to a device for storing piece goods and a method for operating the device.

TECHNOLOGICAL BACKGROUND

In order to satisfy the requirements of a modern and thus sophisticated logistics, it is necessary nowadays to equip the storage devices used for this purpose intelligently and to integrate them in superordinate total systems.

Generally, some approaches for automated storage systems having automatic measuring devices are known already.

DE 10 2007 017 207 A1 describes a sensor for an occupancy recognition, and discloses a drawer having a standard part made of foam material and recesses for receiving tools. At the bottom of a recess, a sensor formed as a reflected-light barrier is located, and comprises a light emitter and a receiver located within spitting distance. As a function of whether a tool is located in the recess or not, the emitted light is reflected or not, such that the receiver generates a signal only in a case when a tool is present in the recess.

DE 197 14 799 C2 shows a device for storing units of goods, the device having a matrix of sensors and corresponding signal lines arranged at a bottom of a goods tray, wherein the signal lines are formed by a conductor board strip in the area of the goods tray, on which strip also the sensors are mounted, wherein the sensors are pressure sensors, capacitive/inductive sensors or mechanical switches.

A photocopying device is known from U.S. Pat. No. 5,328,169, which device ranges the generated copies in different compartments, which are arranged inclinedly one upon the other. Both a light emitting diode and a light sensor are arranged spaced at a distance from each other at a lower end of each compartment, wherein the light emitting diode, which is arranged under the respective compartment, irradiates through a hole in the respective compartment into the light sensor of the compartment arranged above. On the basis of the presence of a signal at the light emitting diode, an associated electronics recognizes, whether paper is arranged between the light emitting diode and the light sensor: If a signal is present, no paper is present in the compartment. If no signal is present, the light beam is interrupted and paper lies in the compartment. Due to the light emitting diode and the light sensor being arranged separately from each other in the height direction of the compartment, there results a relatively large design size. By the described arrangement, one can only determine, whether paper lies at the lower end of the respective compartment.

In addition to that, further solutions are known, which determine the weight of piece goods by force sensors, such as e.g. weighing cells or strain gauge pressure transducers, and in this way detect an occupancy at a particular location.

Optical systems are known, in which cameras record images, and the image data are evaluated in respect of an occupancy recognition.

Disadvantages of these solutions are, generally, the use of sensors acting unilaterally and therefore the necessity to place a storage good within spitting distance to the sensor as well as partially complex systems, which render a manufacturing expensive, or which are generally not suitable for a retrofitting of existing systems.

SUMMARY OF THE INVENTION

There may be need to indicate a device for storing piece goods as well as a method for operating the same, which detect the number and the type of piece goods in a simple manner, and, on the basis thereof, are capable to trigger repeat orders of the piece goods.

According to an exemplary embodiment of the invention, there is provided a device for storing piece goods, in particular a shelf unit or a cupboard. The device has at least one shelf, which has an upper side, on which the piece goods are storable in a surveillance space, and a lower side and openings, which run from the upper side to the lower side, and has signal transmitting devices with associated signal receiving devices, wherein at least one type of the devices is arranged in the openings at the lower side and a signal of the signal transmitting devices is detectable by the signal receiving devices. The shelf further has a control electronics having a control system, which energize the signal transmitting devices and the signal receiving devices and process signals of the signal receiving devices and identify them, so as to identify an occupancy state of the surveillance space with piece goods on the basis of the existence of a signal at the respective signal receiving device.

The piece goods may comprise advantageously cardboard packages (or paperboard containers), aerosol cans, cases (or suitcases), storage boxes and tool boxes.

Preferably, the shelves (or floor sheets) may be inclined, i.e. at an angle to a horizontal.

Advantageously, a protection layer, which may be transparent for signals, for example a foil (or film), may be arranged at the upper side of the at least one shelf, so as to protect the openings.

In a first variant, the signal transmitting devices (or signal transmitters) and the signal receiving devices (or signal receivers) may be arranged together in an opening at the lower side of the at least one shelf.

In a second variant, either the signal transmitting devices or the signal receiving devices may be arranged in openings at the lower side of the at least one shelf, and the other type of devices (signal transmitting device or signal receiving device) may be arranged above the openings, wherein preferably precisely one signal receiving device may be associated to each signal transmitting device, for example they may be arranged on a same axis.

Preferably, the signal transmitting devices and/or the signal receiving devices of openings of a section of the at least one shelf may be combined to a sensor assembly, so as to surveil (or monitor) this section with this one sensor assembly.

In this case, advantageously, a row (or line) of openings, which may be arranged linearly one behind the other, may form the section.

In such an arrangement, for shelves that may be inclined, the row of openings may run from a deepest point of the shelf to a highest point of the shelf, in particular linearly and on the shortest path, and the signal transmitting devices and/or the signal receiving devices of the openings may be combined to a sensor assembly, in particular so as to associate to the sensor assembly in the control system a particular piece goods, for example a particular cardboard package or aerosol can.

Advantageously, in this case, a footprint (or standing area) of the respective piece goods on the shelf may be stored in the control system, such that the control system can (or is capable) calculate the number of same pieces of the piece goods on the shelf along the sensor assembly on the basis of the signals from the signal receiving devices of the sensor assembly and the footprint of the individual piece goods.

The storing in the control system of a footprint of the respective piece goods on the shelf may be advantageous, because the control system can calculate the number of same pieces of the piece goods on the shelf along the sensor assembly on the basis of the signals of the signal receiving devices of the sensor assembly and the footprint of the individual piece goods.

According to an exemplary embodiment of the invention, there is provided a method for operating a device as described above. The method has the following steps:
a. providing the at least one shelf;
b. subdividing the shelf into sections;
c. arranging pieces of a same piece goods in a same section;
d. establishing a correlation in the control electronics and/or in the control system, which piece goods are arranged in which section of the shelf; and
e. evaluating signals of signal receiving devices of the section, so as to determine the number of pieces of the piece goods in the section.

The outputting of an ordering signal by the control system to a person and/or to an ordering system may be effected preferably, when the number of same pieces of piece goods in a section has a pre-defined threshold value.

The outputting of an ordering signal may comprise advantageously the sending of a mail, an SMS or an MMS.

This outputting may comprise preferably a transmitting of information relating to an identification (or characterization) of the piece goods, for example an item number (or product code), information relating to the required number of pieces of the piece goods as well as information relating to an identification of the shelf and/or of the device for storing piece goods for addressing an additional delivery of the piece goods.

An inclined arrangement of the at least one shelf may be advantageous, because pieces of a same piece goods in the respective section may slide (or slip) to the lower end of the shelf by the gravitation, and thus may be available for a simplified withdrawal (or taking out).

The arrangement of separating elements between adjoining sections of the shelf may be advantageous, so as to separate piece goods on the shelf from each other.

Further features, details and advantages of the invention follow from the claims of protection, the wording of which is made contents of the description by reference. The features, which are mentioned above and which are still to be explained in the following, are usable not only in the respectively indicated combination, but also in other combinations or in an island position (or taken alone), without leaving the framework of the present invention. Embodiments and examples of the invention are represented in the drawings and are explained in more detail in the following description.

SHORT DESCRIPTION OF THE DRAWINGS

Figure 5:
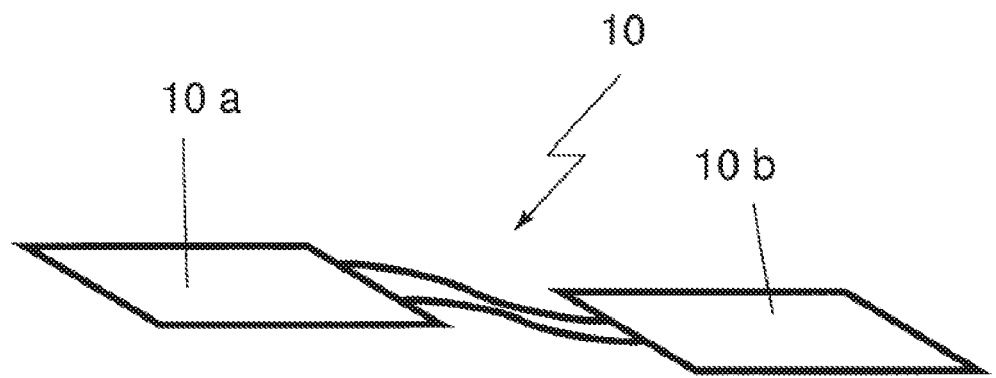
Figure 6:
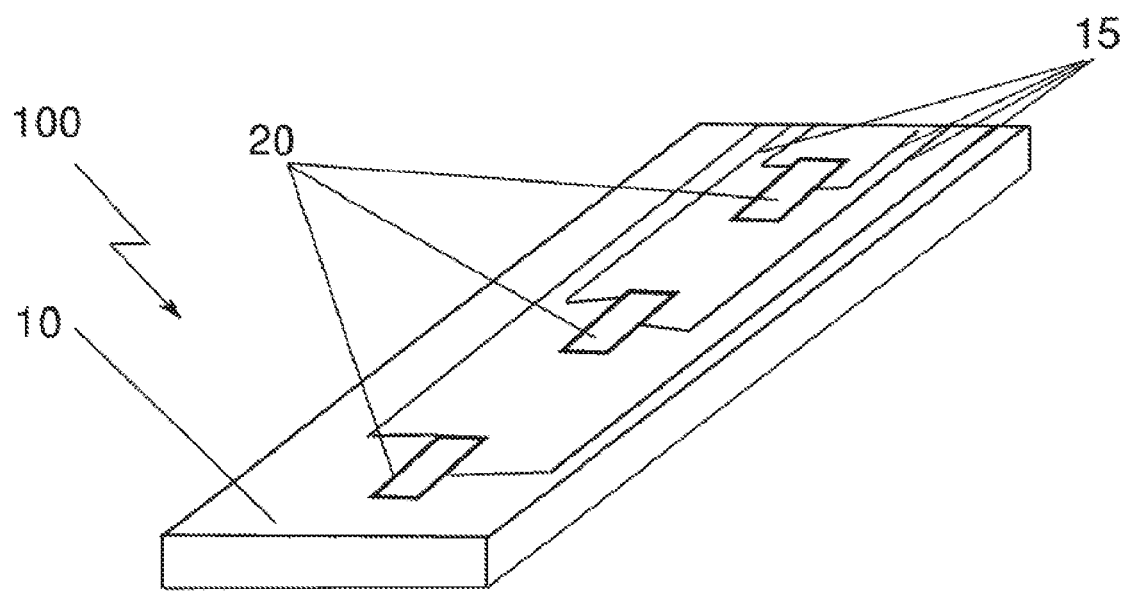
Figure 7:
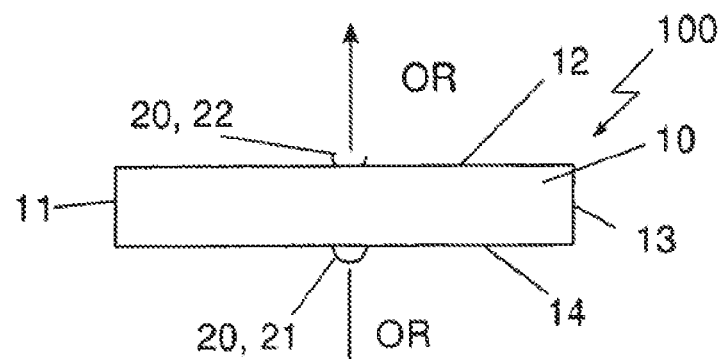
Figure 8:
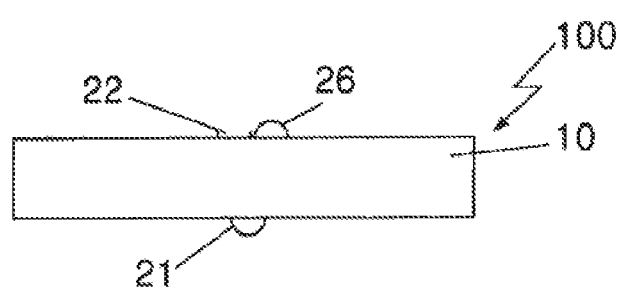
Figure 9:
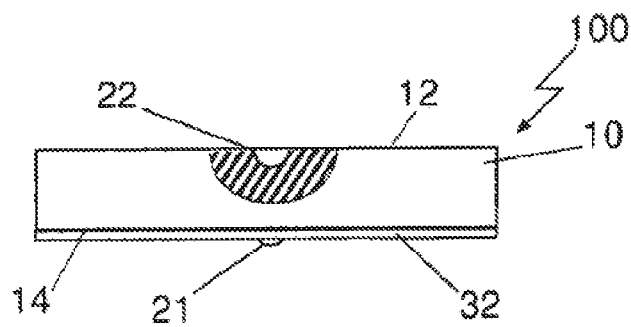
Figure 10:
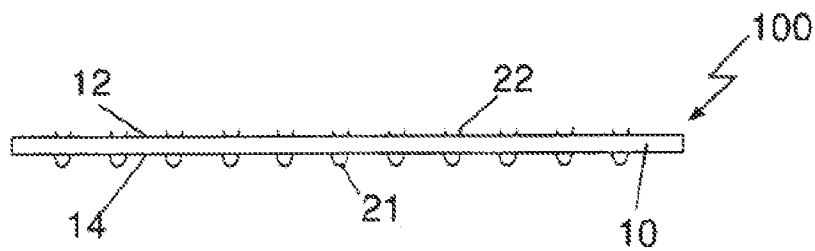
Figure 11:
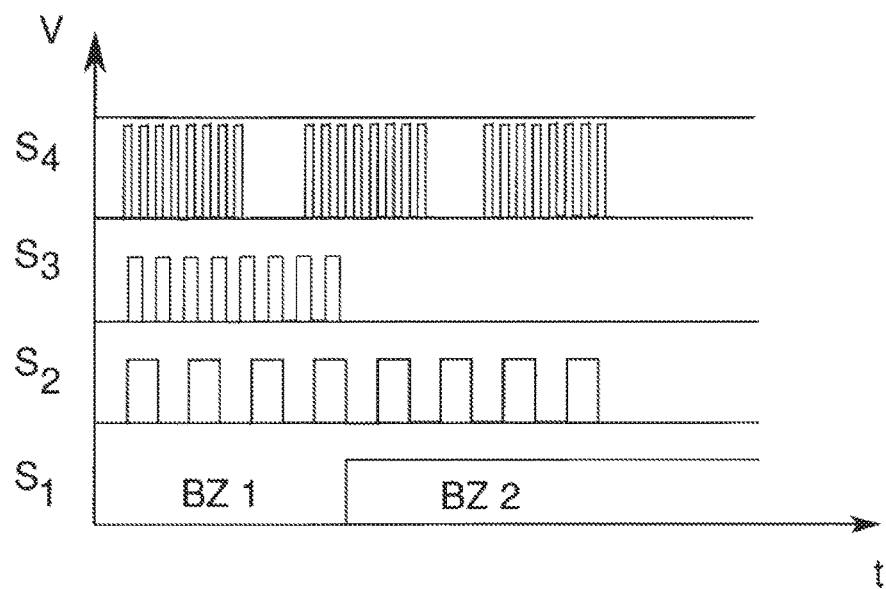
Figure 12:
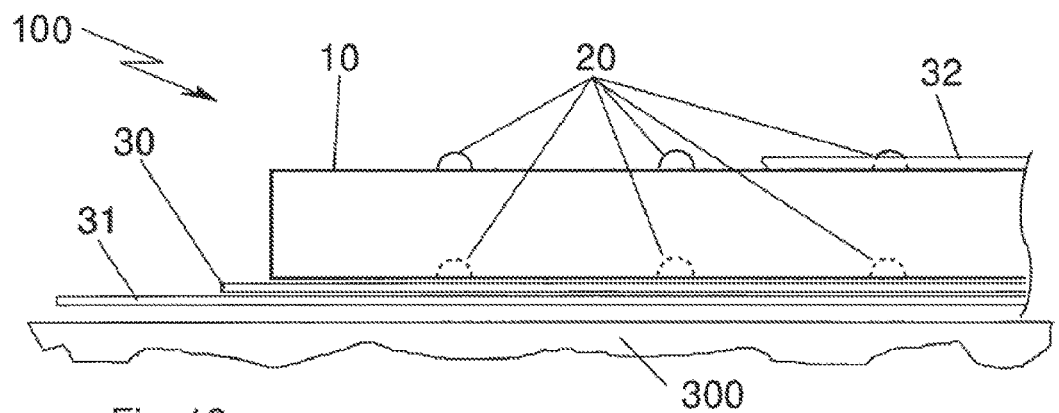
Figure 13:
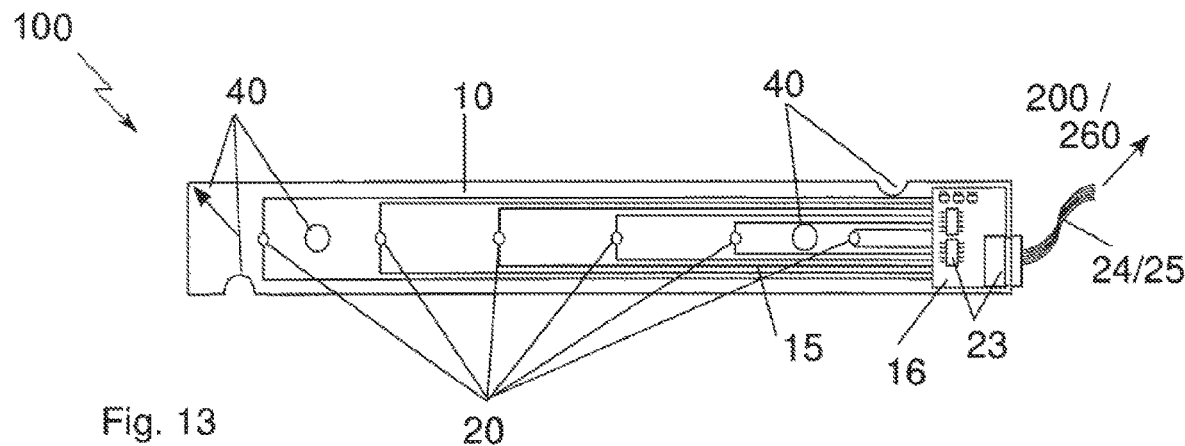
Figure 14:
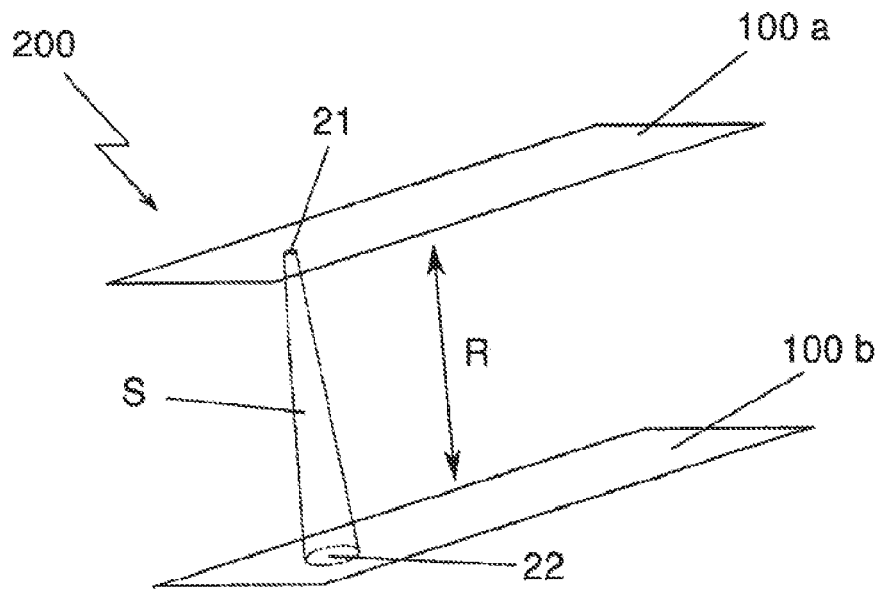
Figure 14:
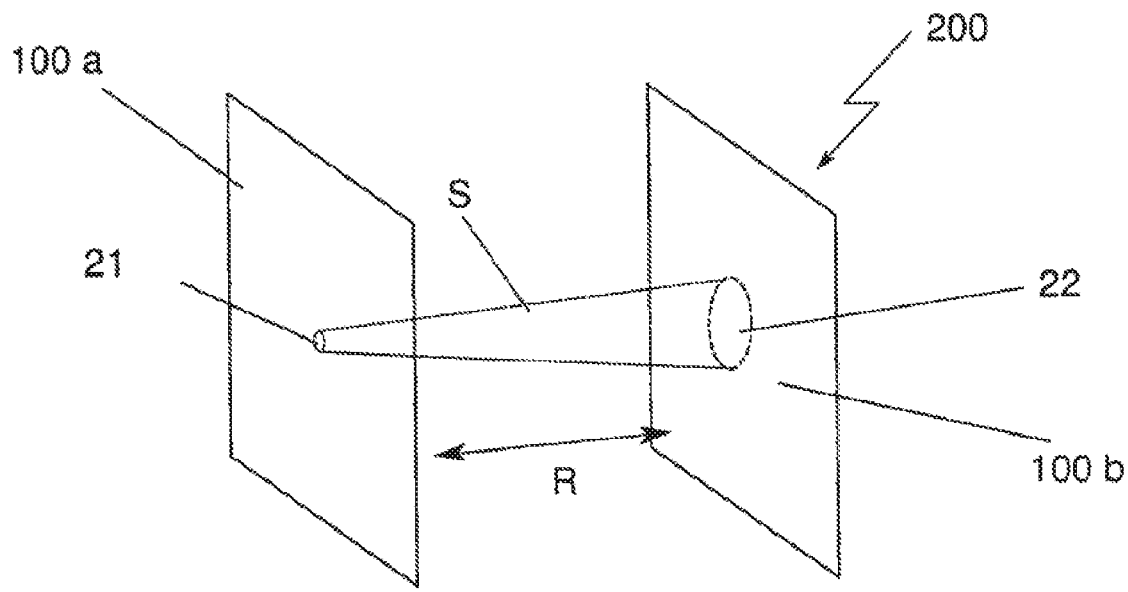
Figure 15:
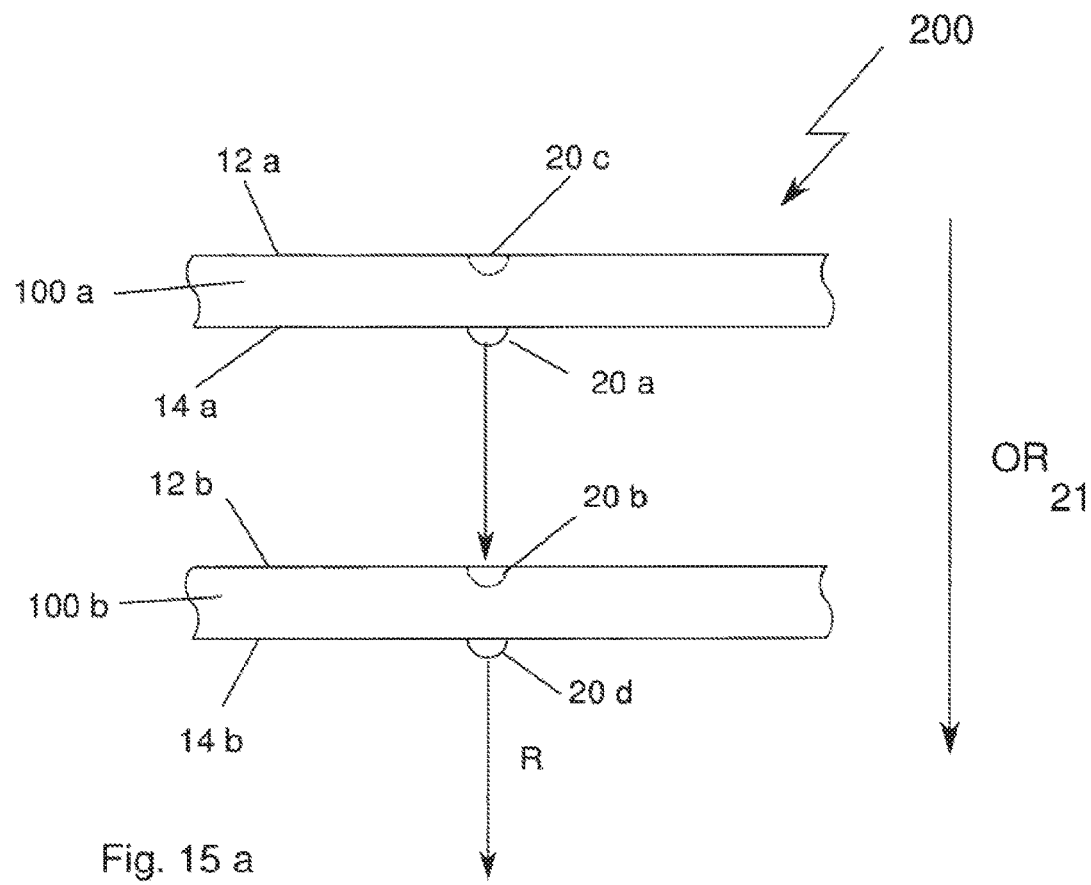
Figure 15:
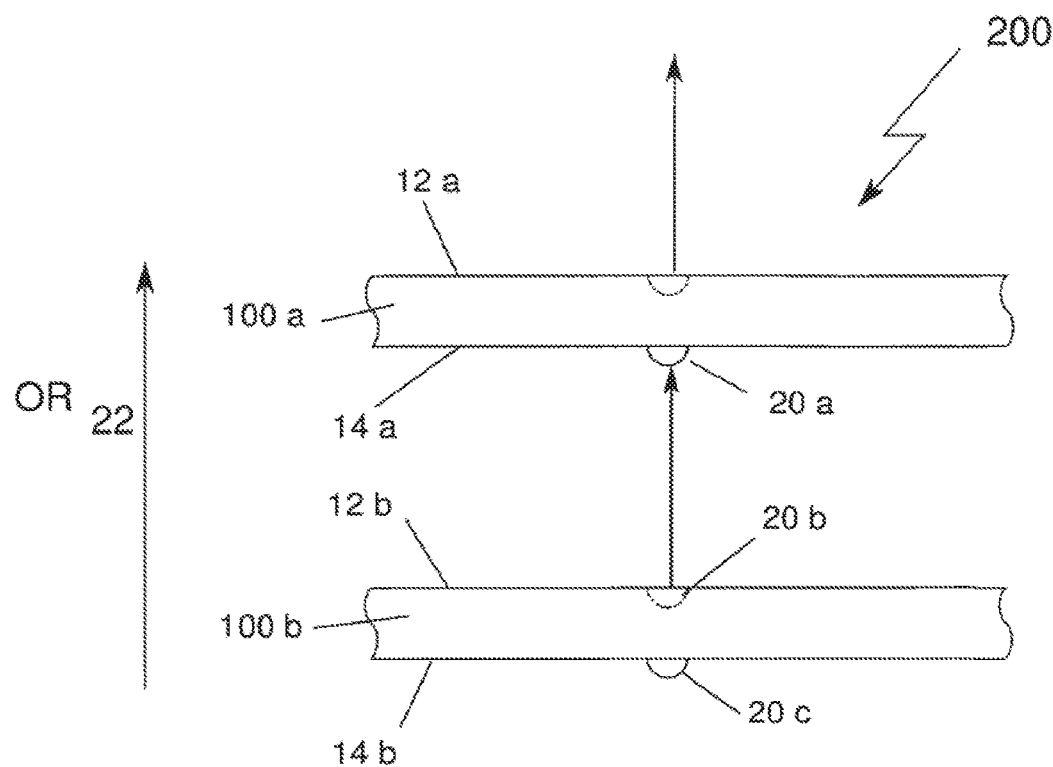
Figure 16:
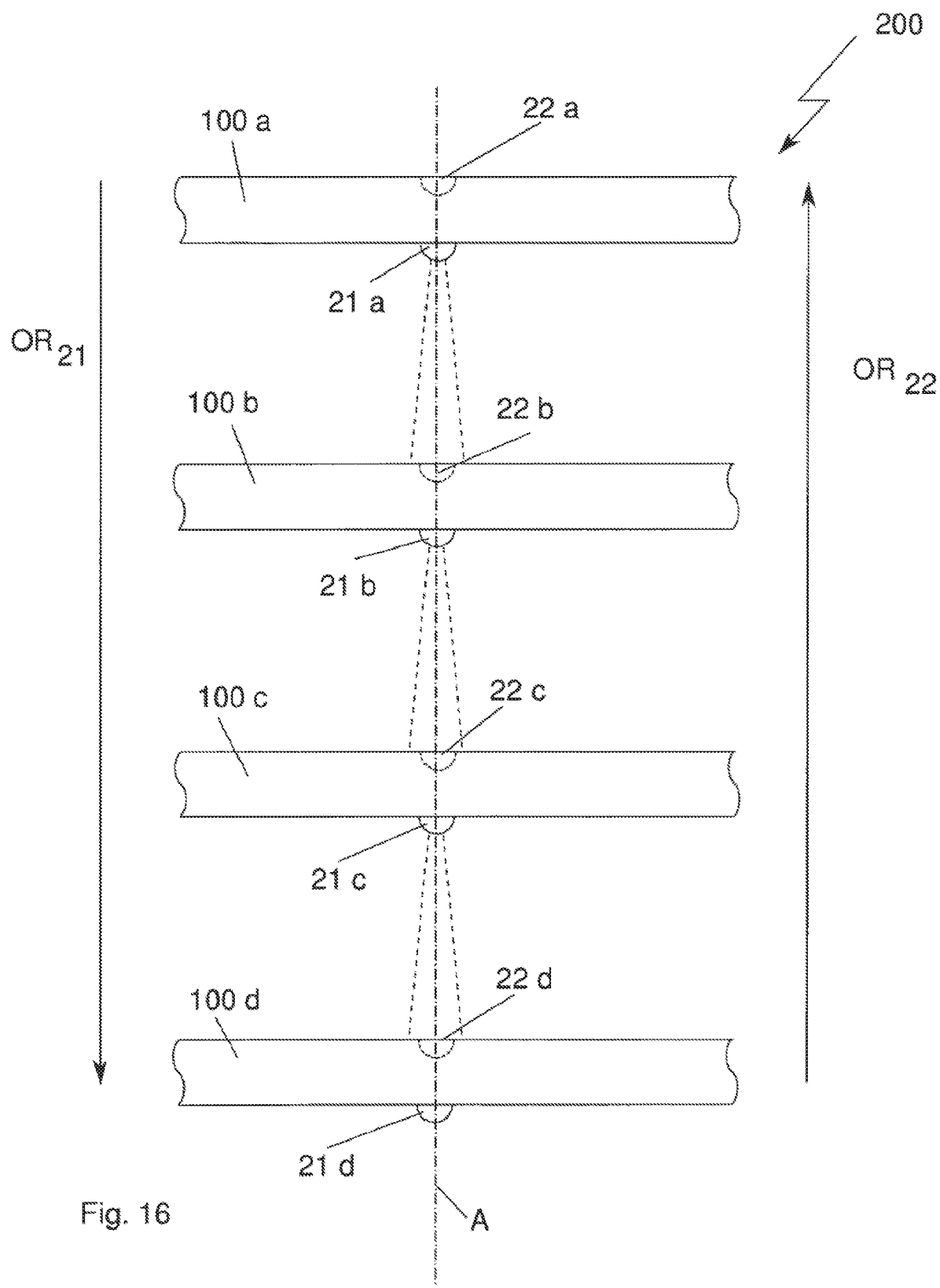
Figure 17:
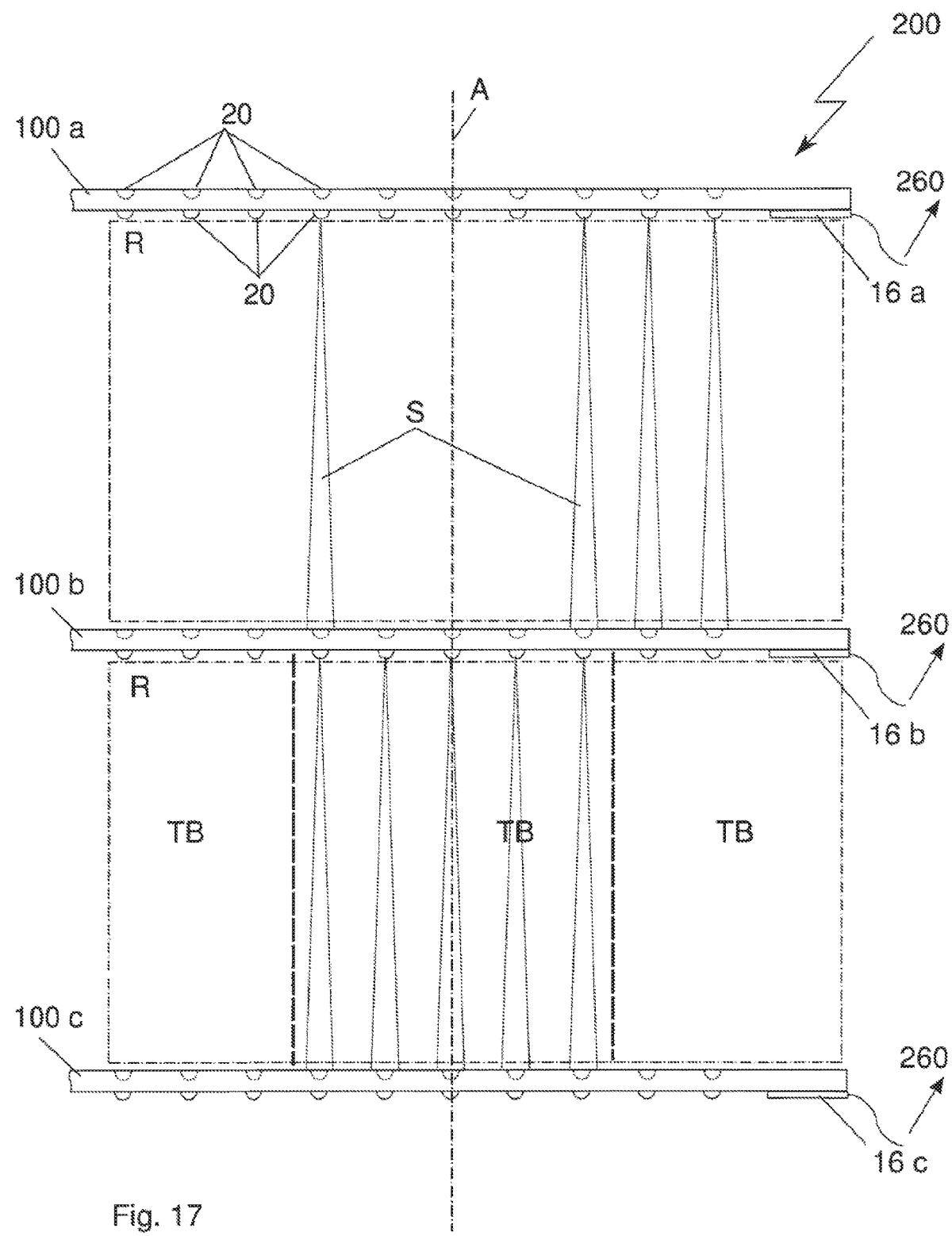
Figure 20:
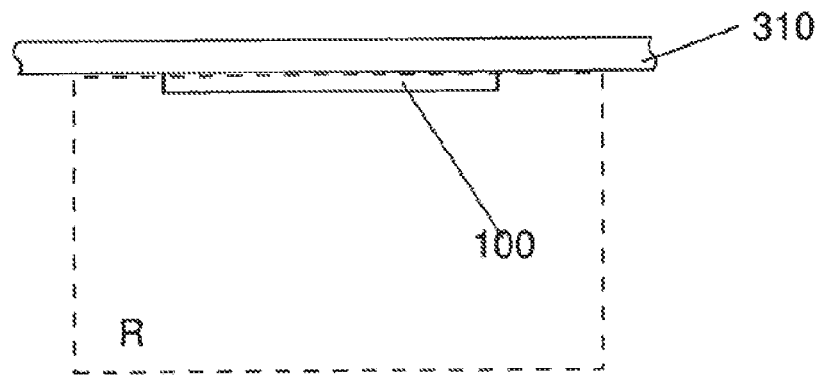
Figure 20:
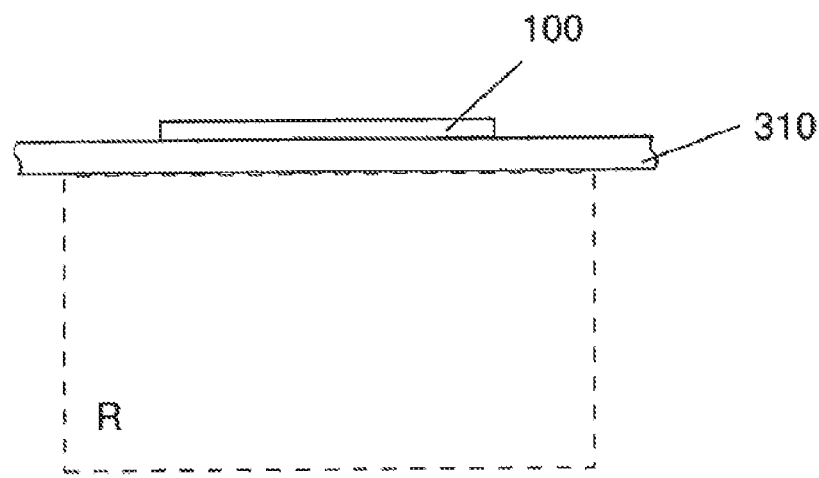
Figure 20:
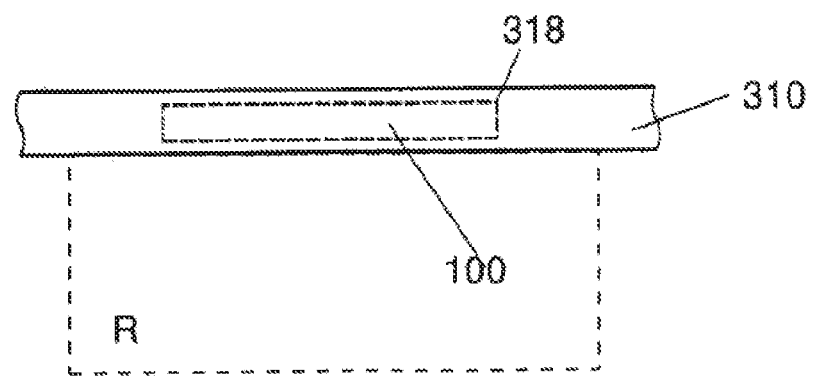
Figure 21:
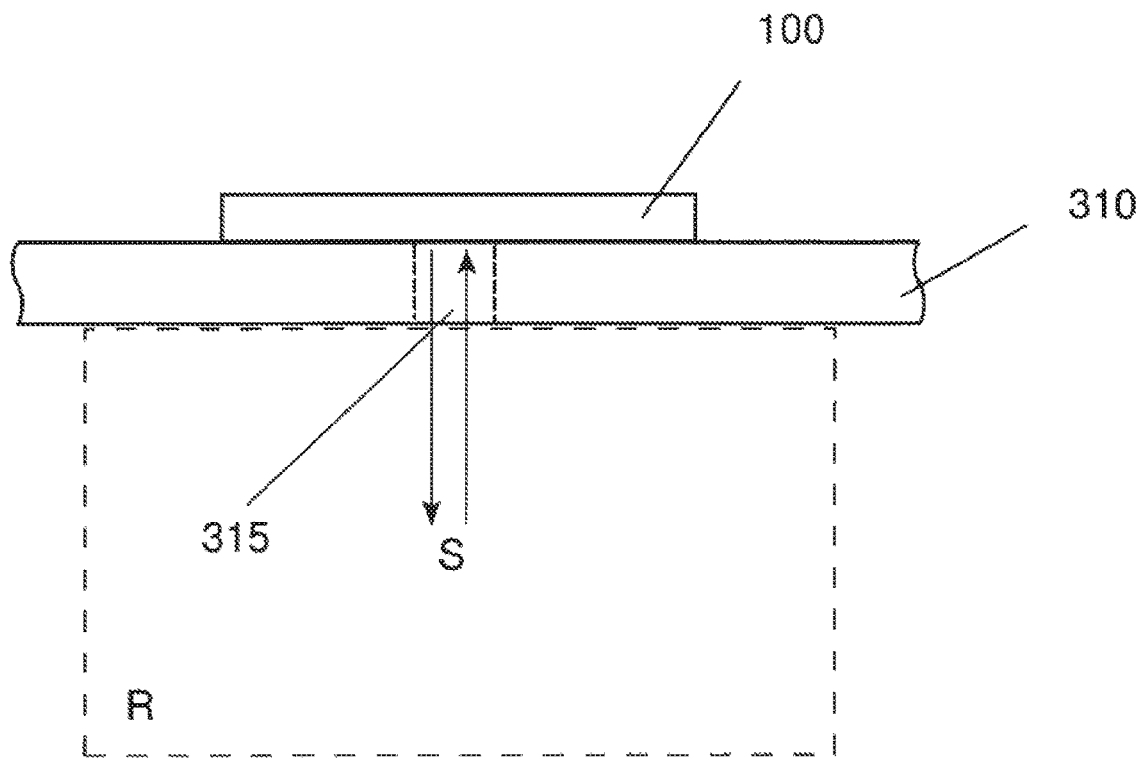
Figure 21:
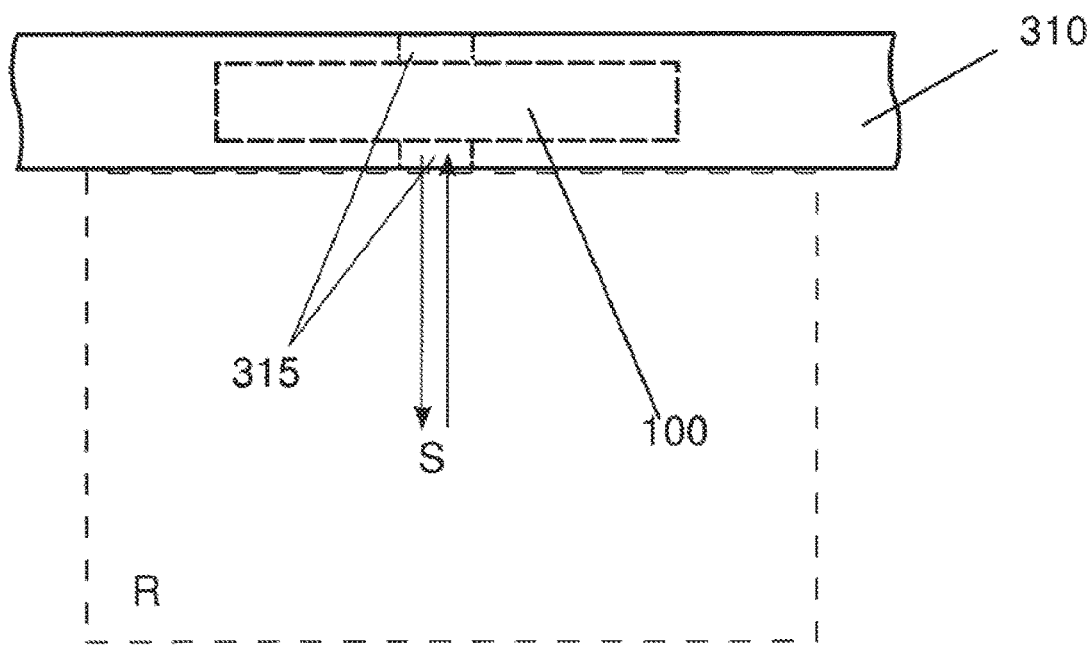
Figure 22:
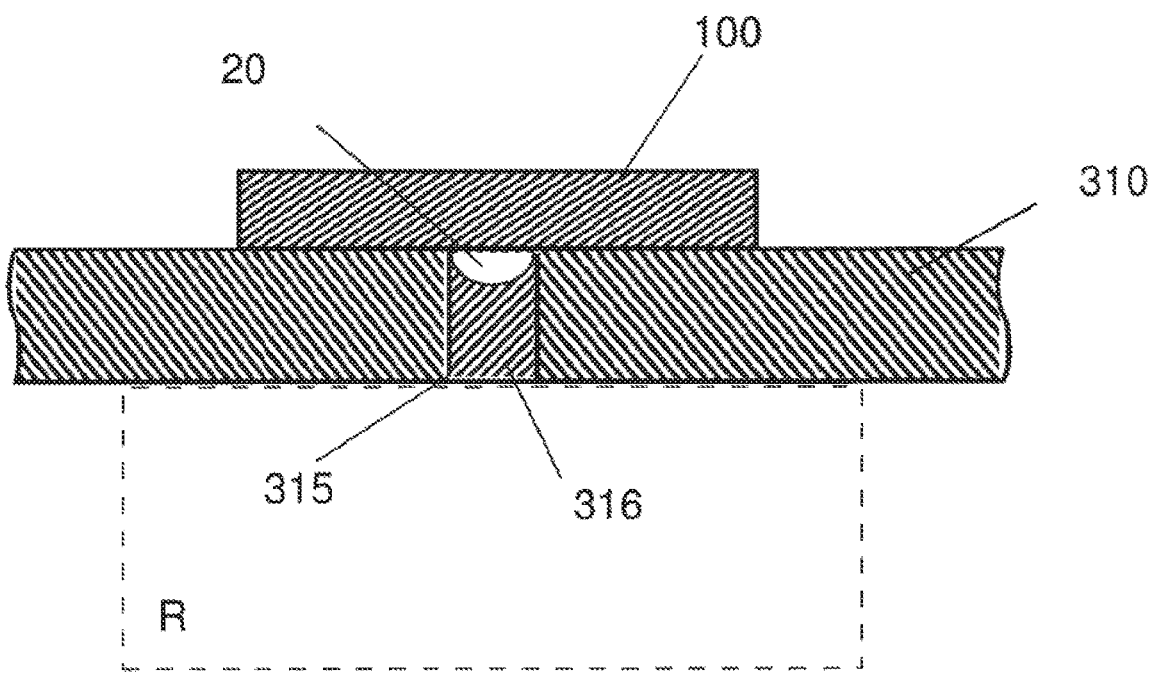
Figure 22:
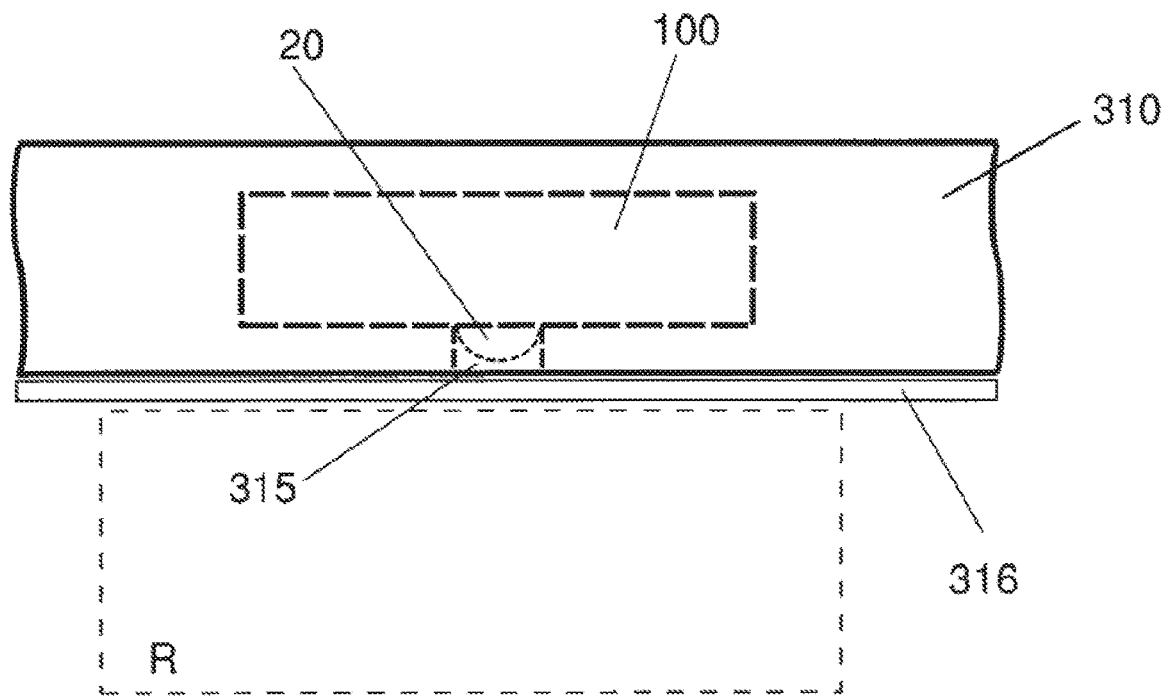
Figure 23:
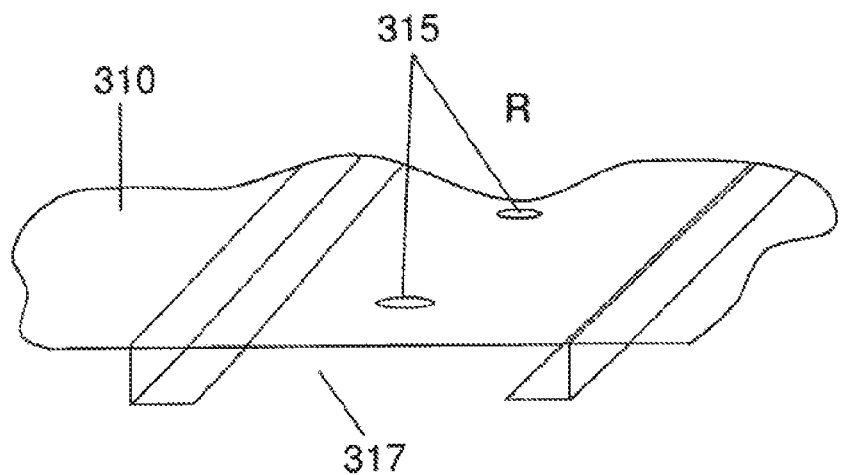
Figure 23:
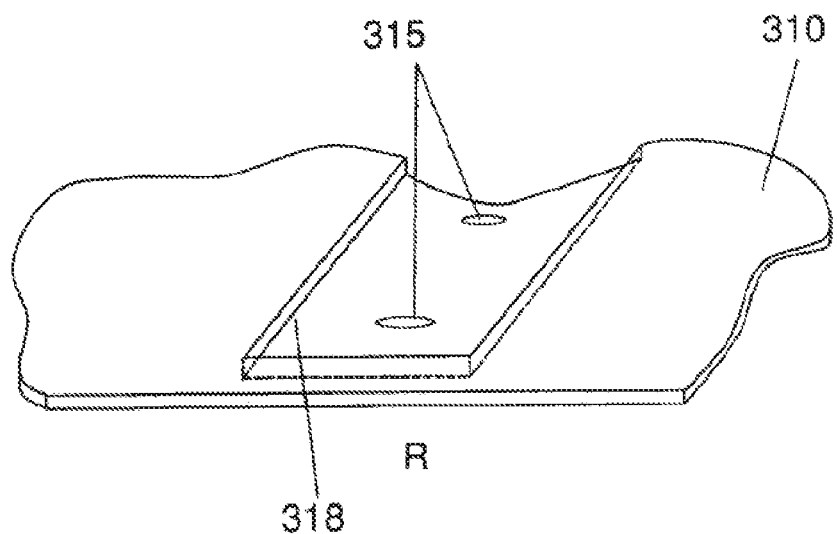
Figure 24:
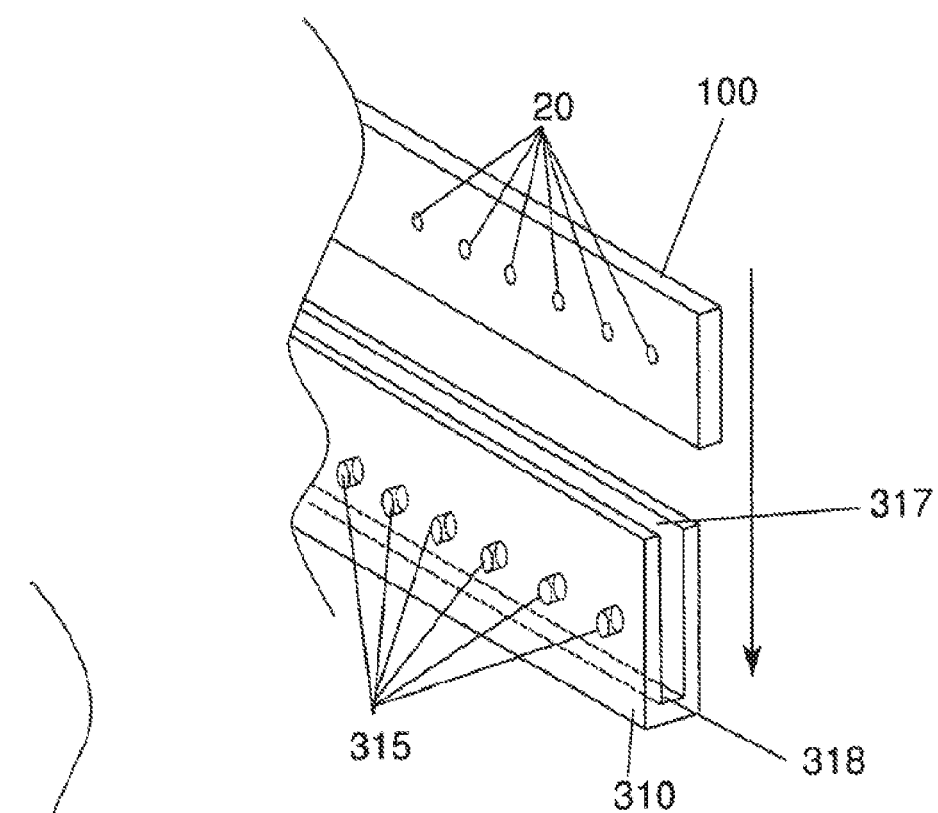
Figure 24:
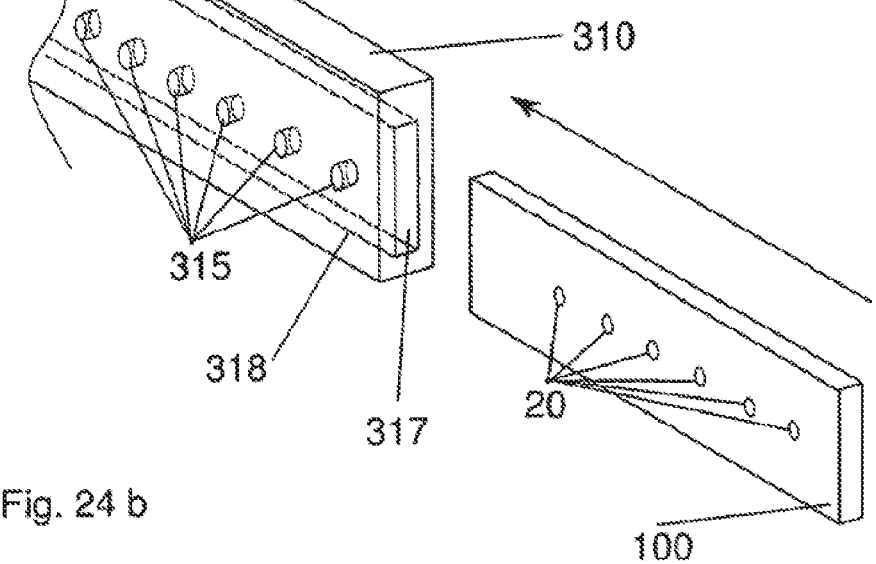
Figure 25:
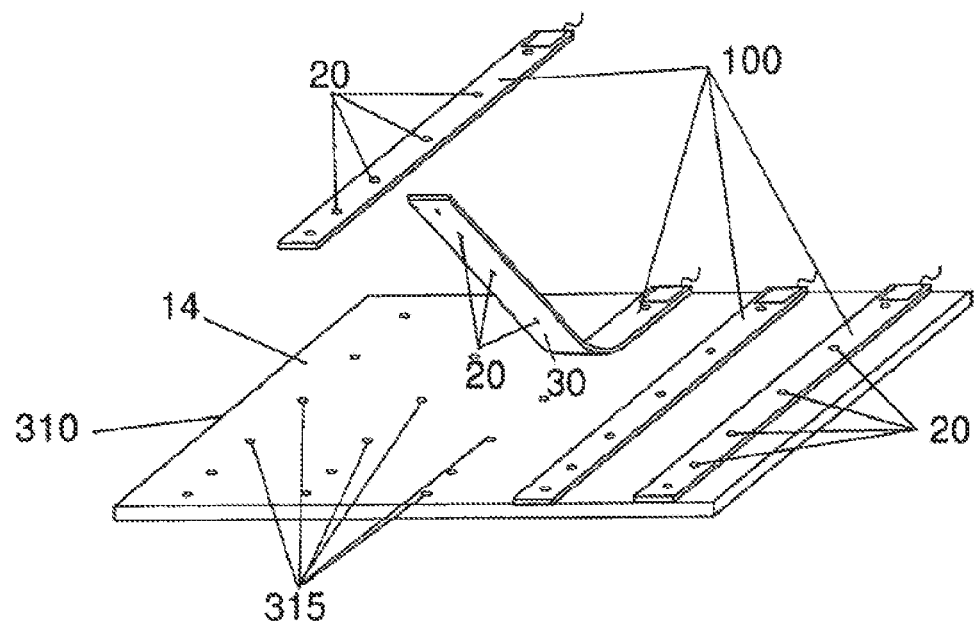
Figure 26:
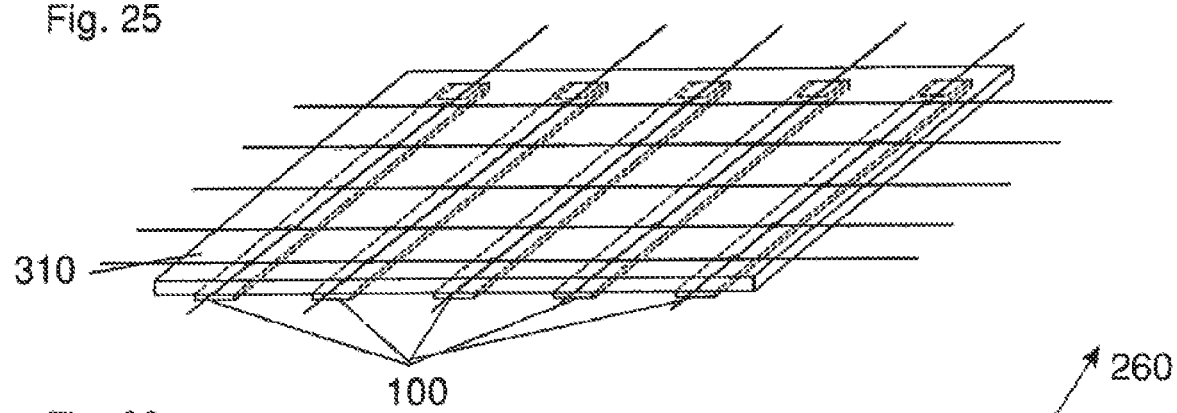
Figure 27:
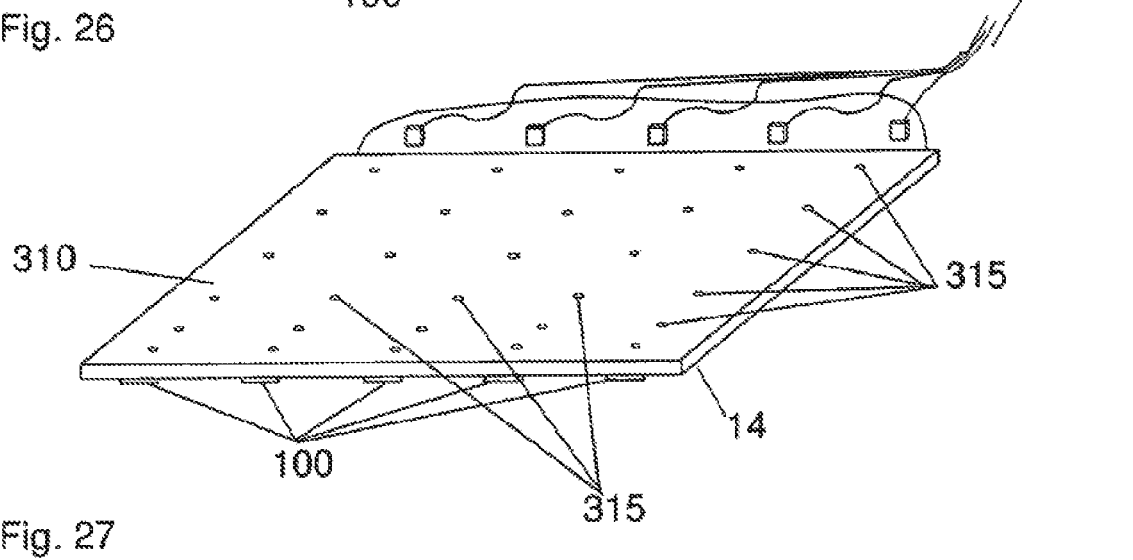
Figure 30:
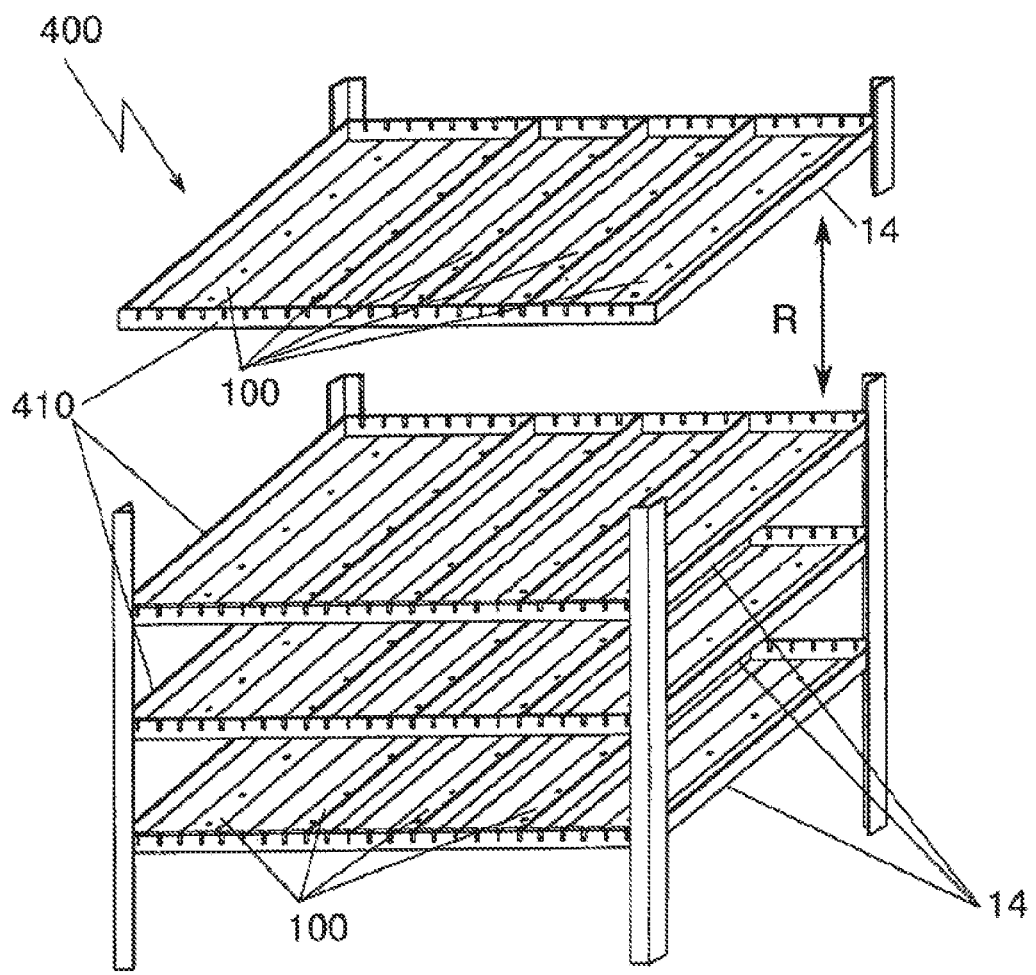
Figure 31:
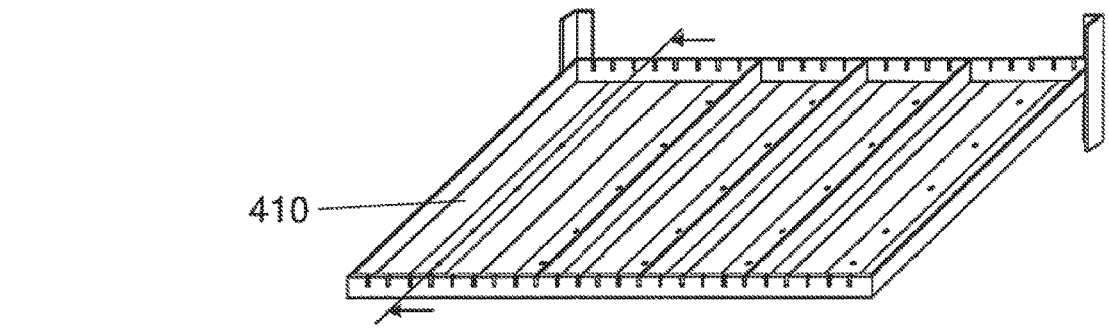
Figure 31:
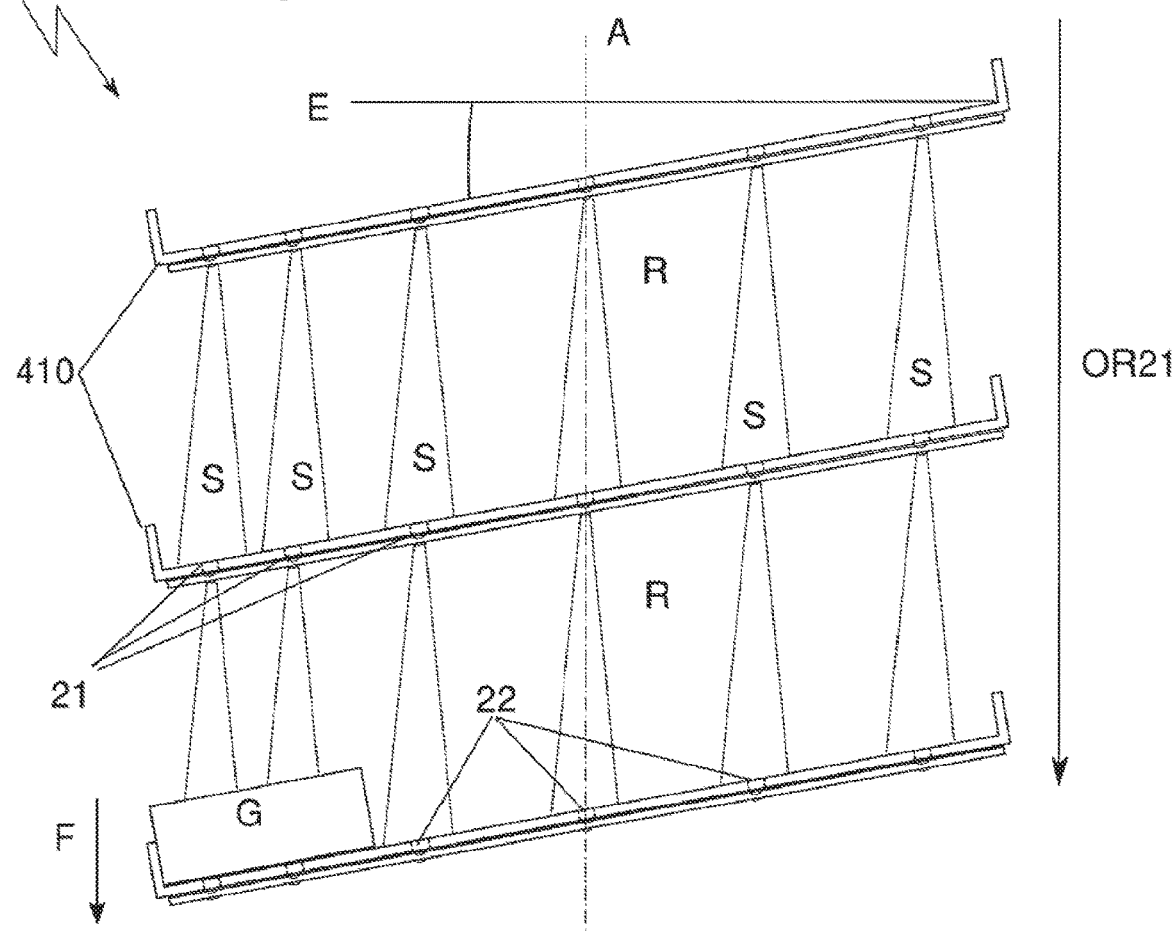
Figure 32:
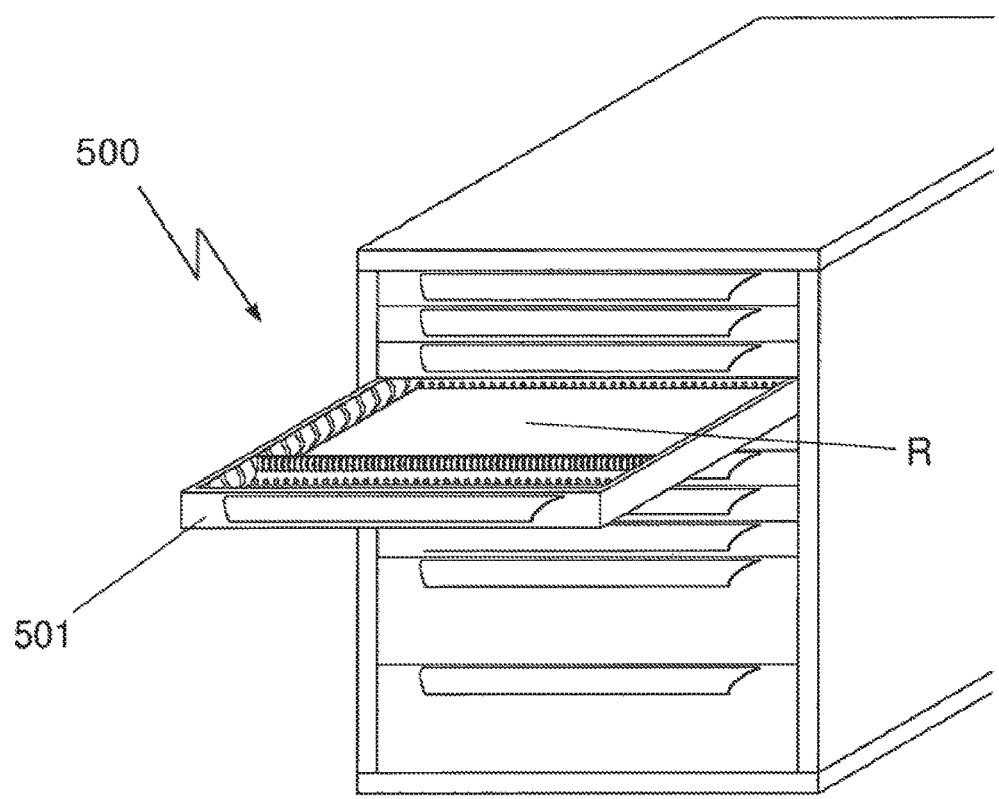
Figure 33:
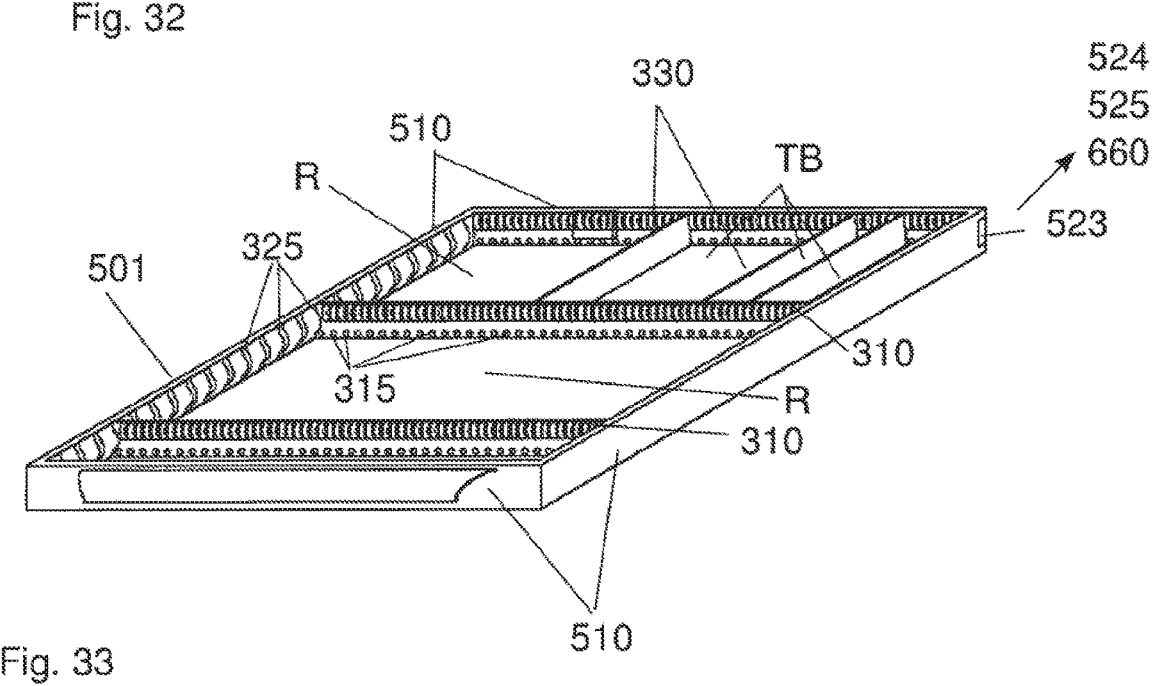
Figure 34:
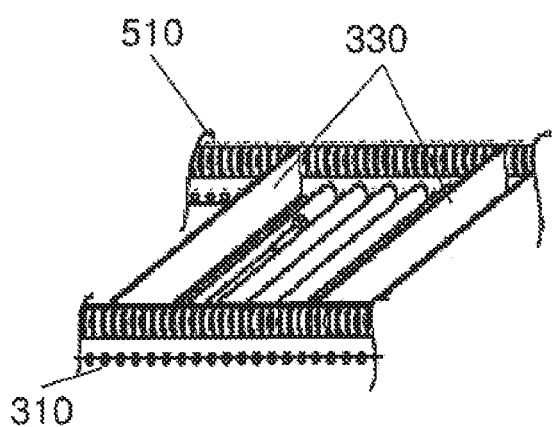
Figure 34:
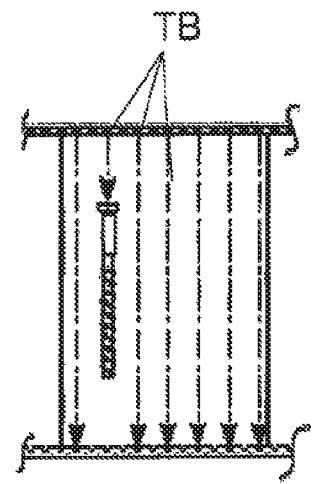
Figure 35:
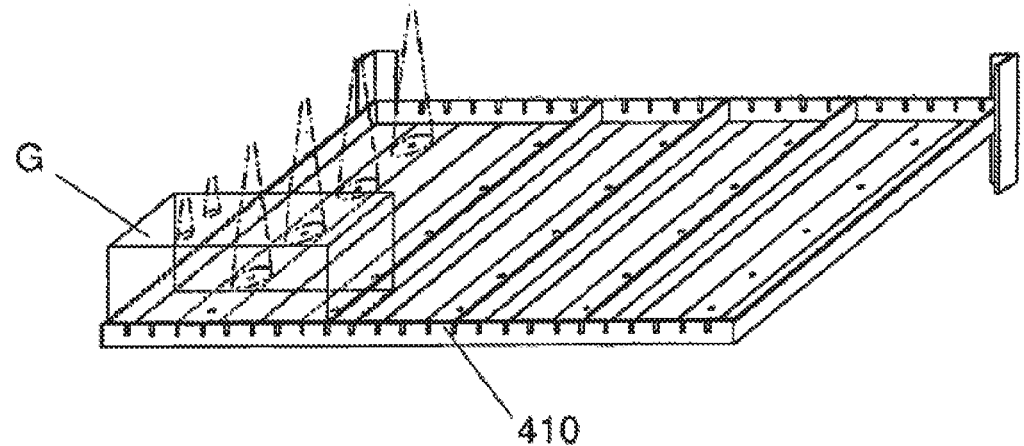

The drawings show the following:
FIG. 1: a perspective view of a sensor assembly;
FIG. 2*a-d*: different views of a sensor assembly;
FIG. 3*a-c*: perspective views of possible cross-sections of a sensor assembly;
FIG. 4*a-e*: top views of possible shapes of a sensor assembly;
FIG. 5: a perspective view of a sensor assembly;
FIG. 6: a perspective view of a sensor assembly;
FIG. 7: front view of a sensor assembly;
FIG. 8: front view of a sensor assembly;
FIG. 9: front view of a sensor assembly with a partial section;
FIG. 10: side view of a sensor assembly;
FIG. 11: diagram of possible signals;
FIG. 12: side view of a sensor assembly;
FIG. 13: top view of a sensor assembly;
FIG. 14*a,b*: schematic representation of a sensor system;
FIG. 15*a,b*: side view of a sensor system;
FIG. 16: side view of a sensor system;
FIG. 17: side view of a sensor system;
FIG. 18*a-c*: schematic representations of a storage device;
FIG. 19*a-d*: schematic representations of a storage device having different occupancy states;
FIG. 20*a-c*: side views relating to an arrangement of a sensor assembly at a storage device;
FIG. 21*a,b*: side view of delimitation elements;
FIG. 22*a,b*: side view and section of a delimitation element;
FIG. 23*a,b*: perspective representations of delimitation elements;
FIG. 24*a,b*: perspective representations of delimitation elements;
FIG. 25: perspective representation of a delimitation element;
FIG. 26: perspective representation of a delimitation element;
FIG. 27: perspective representation of a delimitation element;
FIG. 28*a-c*: perspective representation as well as top view and detailed view of a delimitation element;
FIG. 29: perspective representation of a shelf;
FIG. 30: perspective representation of a shelf unit;
FIG. 31*a,b*: shelf and section through plural shelves;
FIG. 32: perspective representation of a cupboard;
FIG. 33: perspective representation of a drawer;
FIG. 34*a,b*: perspective representation of a section of a drawer as well as a top view of a drawer;
FIG. 35: perspective representation of a shelf.

DETAILED DESCRIPTION OF EXEMPLARY EMBODIMENTS

FIG. 1 shows a perspective view of a sensor assembly 100, which, in an embodiment according to the invention, may be manufactured with a carrier (or supporting device) 10 made of a flexible material. The view is obliquely from the above onto the front left corner, which is represented lifted up here, and enables a view both on the upper side 12 and on the lower side 14. At least one sensor element 20 may be arranged both on the upper side and on the lower side 12, 14 on the sensor assembly 100 according to the invention.

Figure 2:
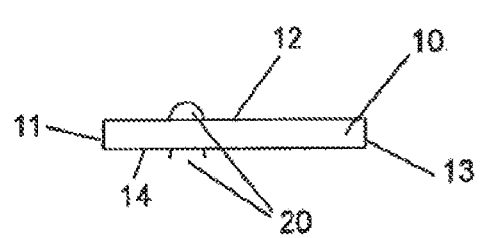
Figure 2:
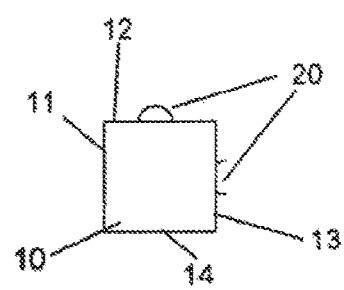
Figure 2:
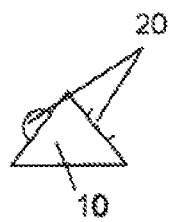
Figure 2:
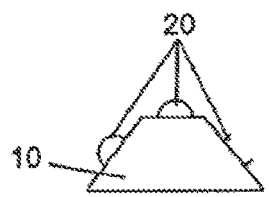
Figure 3:
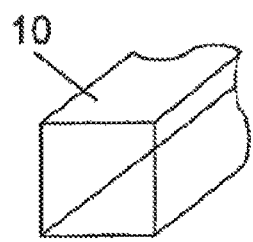
Figure 3:
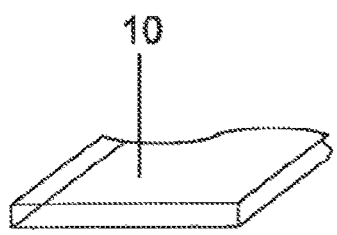
Figure 3:
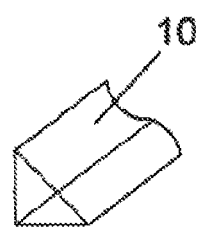

This arrangement may enable the sensor assembly to function in two directions (FIG. 2*a*). In principle, each of the outer surfaces of the sensor assembly can be equipped with sensor elements, such that a sensor assembly could function in all three spatial axes, respectively, in two directions. In FIG. 2*b*, such a sensor assembly having the sensor elements at least on two side surfaces 12, 13 is represented in a top view. The representation of sensor elements in the remaining side surfaces 11, 14 and in the front surfaces has been dispensed with. A sensor assembly as in FIG. 2b, together with further sensor assemblies being deviated by 90° respectively, could surveil (or monitor) a space (or chamber, or area, or volume) at its space borders. A sensor assembly according to FIG. 2c, in combination with further sensor assemblies, could surveil a space diagonally respectively, with an embodiment as in FIG. 2d also in the direct spatial axes.

At this time, the cross-section of a sensor assembly can assume plural possible shapes (FIGS. 3a-c). For an incorporation of respective sensor elements, those shapes (or forms) may be suitable at best, which may provide a plane surface with respect to the dimensions (or sizes) or the number of the incorporated sensor elements, for which [purpose] a cross-section having corners (or angles) may be most suitable.

Figure 4A:
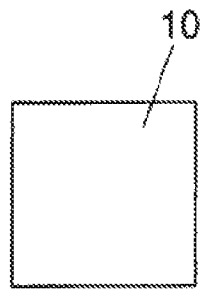
Figure 4B:
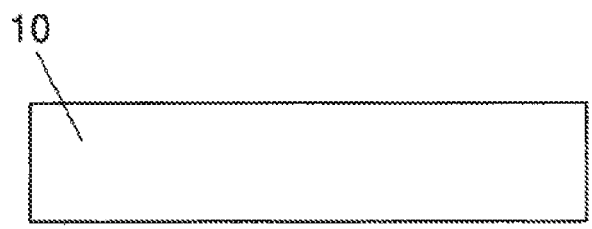
Figure 4C:
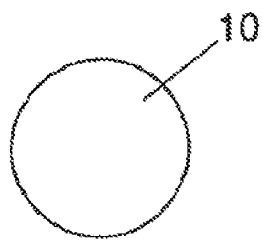
Figure 4D:
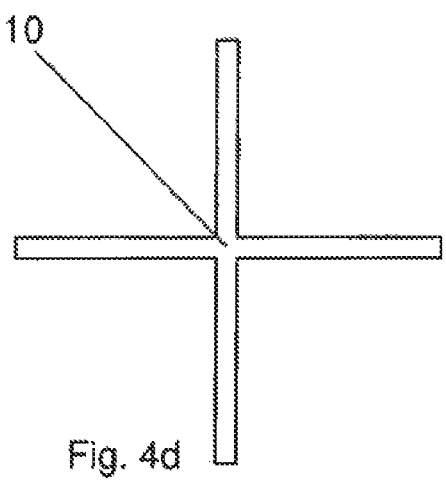
Figure 4E:
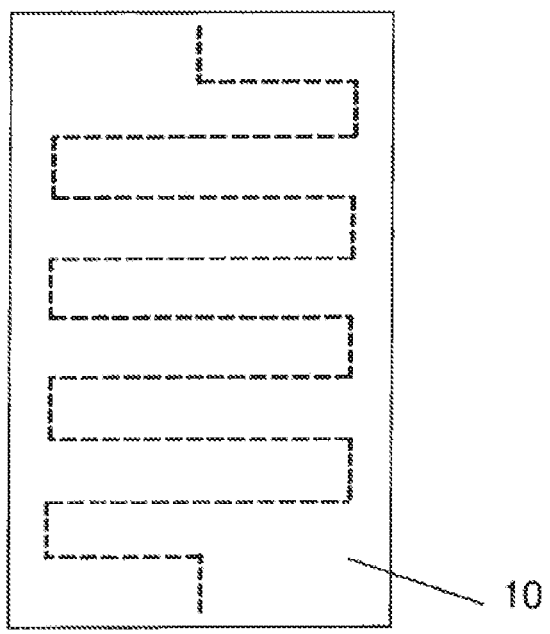

FIGS. 4a-c show the top views of plural possible forms (or shapes) of sensor assemblies for a best possible adaptation to the space to be surveilled (or monitored). If the sensor assembly is to be optimized with respect to the design shape of the space to be monitored, the assembly can be manufactured with a form (or shape), which is not holohedral (or not covering the whole surface), but nevertheless covering the space in a best possible way, such as cruciform (or crosswise) (FIG. 4d) or meander-shaped (FIG. 4e), wherein the sensors can be put on the dashed line, or the shape of the carrier is narrow and follows the dashed line.

In an embodiment according to the invention, the sensor assembly may be formed as a flat stripe (or strip) (FIG. 4b), i.e. the height may be much smaller than the width at this time, wherein the width may be smaller than the length. It may also be possible to form a longer sensor assembly from a carrier 10 having two or also more sections 10a, 10b, which may incorporate the sensor elements later on, and to connect the sections to each other by one flexible partial section respectively, wherein the partial section may contain in particular also the electrical lines for the power supply and the signals of the sensor elements (FIG. 5).

FIG. 6 shows a perspective view of a sensor assembly 100, in an embodiment according to the invention, having a stripe-shaped carrier 10. At this time, the carrier (or supporting device) 10 can be manufactured from a rigid or from a flexible material, but also from a composite of plural layers of a same material or of different materials. In the embodiment according to the invention, the carrier 10 may act at the same time as a conductor board, and may be provided with corresponding conductor paths 15 as well as points (or locations) for contacting the sensor elements 20 and/or possibly further electrical components or component groups. The conductor paths 15 as well as also the contact surfaces for the sensors can be applied directly on the carrier, or also on a foil (or sheet), which is laminated on the carrier later on.

FIG. 7 shows the front view of a sensor assembly 100 according to the invention having one sensor element 20 arranged, respectively, on an outer surface 12, 14. The sensor elements 20 may be, respectively, exemplars of one type of device, and may namely be formed as a signal transmitting device (or signal transmitter) 21 or as a signal receiving device (or signal receiver) 22. The signal transmitting devices and the signal receiving devices may be implemented for signals of one type. According to the principle of transmitter-receiver, these may be all types of signals, which may be transmittable and receivable (or capable to be transmitted and to be received), in particular light signals, preferably IR (infrared) light or acoustical signals, preferably ultrasound signals. Light signals are assumed in the further embodiment examples. Here, the signal transmitting devices 21 are represented schematically as circles or closed semi-circles, while the signal receiving devices 22 are represented schematically as open semi-circles and/or "dishes" having the opening pointing away from the respective outer surface. For the sensor elements 20, an orientation direction OR is to be understood such that a straight line leads from their center point and from the highest and/or deepest point of the circle line with respect to the respective outer surface, which straight line indicates the major output or entry direction of the signals.

In a further embodiment according to the invention, a test signal transmitting device (or test signal transmitter) 26 may be arranged beside (or is associated to) a signal receiving device 22, i.e. in immediate or at least collateral distance to the signal receiving device 22 (FIG. 8). Thereby, the operational reliability (or functional safety) of the sensor assembly and/or of the superordinate system can be improved by thereby testing the functional efficiency of the signal receiving device again, if a signal of a first opposing sensor assembly has been transmitted, but no signal has been received. Basically, the same principle may also be applied to a signal transmitting device.

The sensor elements may be integrated in the carrier 10 at least partially on a respective outer surface both as a signal transmitting device 21 and as a signal receiving device 22, so as to protect an according to sensor element on the one hand, or to also obtain a smooth outer surface on the other hand. In FIG. 9, a signal receiving device 22 is shown, which may be integrated completely in the carrier 10 in a partial section on an outer surface 12. At the lower side 14, the integration of a signal transmitting device may be effected by a further layer 32 laminated thereon such that the signal transmitting device 21 may be considered to be integrated in the carrier at least partially, wherein the protection layer 32 may have recesses at the corresponding locations of the positions of a sensor element 20, and thus also may protect the sensor elements and/or the corresponding conductor paths or may provide a smooth outer surface (FIG. 9).

FIG. 10 shows a side view of a sensor assembly 100 having a plurality of sensor elements 21, 22 arranged at a respective outer surface 12, 14, wherein only sensor elements of one type (of device) may be arranged on one outer surface, respectively. In this manner, many sensor assemblies can be combined with each other cascadingly (or in a cascaded manner), i.e. oriented always in one direction. The distance of the sensor elements among each other on one respective outer surface can be selected such that a signal transmitting device always addresses (or appeals to) only one signal receiving device or also plural signal receiving devices by arranging the sensor elements 21, 22 so close to each other that the signal cones may overlap on the receiver side.

FIG. 11 shows a diagram with respect to plural signals. A first signal S1 shows two different occupancy states BZ1 and BZ2, wherein no signal S1 may be received in the occupancy state BZ1 and thus may be interpreted as a sensor area that is occupied with storage goods, whereas a signal S1 may be received in the occupancy state BZ2 and thus may be interpreted as a sensor area without storage goods. Signals S2-S4 show signals having different intensity, modulation or having individual frequency blocks. These signals can be used for improving the signal and/or data integrity, or also for addressing or identifying individual sensor elements, in particular in the case of overlapping signal cones.

FIG. 12 shows a side view of a sensor assembly according to the invention having again a plurality of sensor elements 20 arranged on opposite outer surfaces of the carrier 10, wherein the upper sensor elements 20, by a protective layer 32, may be embedded at least partially in a protective layer 32, and thus an approximately smooth surface may be achieved. By contrast, on the opposite outer surface, the sensor elements 20 may be integrated completely in the carrier 10. On this lower side, an adhesive layer 30 may be applied, which may be covered by a non-adhesive covering layer 31. At least the adhesive layer 30 may have according recesses at the positions of the sensor elements 20, so as to not damage or contaminate the sensor elements 20, and so as to let pass the signals unobstructedly (or unhinderedly) later on. For a later mounting, the non-adhesive covering layer 31 may be removed from the adhesive layer 30, and thus can be aligned on a device 300 and affixed (or mounted) to the device 300 by the adhesive layer 30.

FIG. 13 shows a top view of a sensor assembly 100 according to the invention having a carrier 10 and conductor paths 15 arranged on the carrier 10 as well as sensor elements 20 connected to the conductor paths 15. A small rigid conductor board may be mounted at the right end of the sensor assembly, which conductor board may contain the control electronics 16 that may be necessary for controlling the sensor elements 20 and further electric or electronic components 23, for example a plug connector element 23 [to be used] for power supply and for receiving and/or outputting control signals 24/25 of the sensor elements 20 for transmission to a superordinate sensor system 200 and/or to a superordinate control system 260. The sensor assembly 100 may have additional markings and/or devices 40 for fixing to a device, which may be implemented as optical (or visible) markings (e.g. as an arrow) or as shapes (e.g. semi-circles, drill holes). In particular, the drill holes can be used to fix the sensor assembly 100 to a defined position with a screw etc. later on.

FIG. 14a shows schematically the arrangement of a sensor system 200 consisting of a surveillance space (or monitoring chamber, or monitoring area) R and two sensor assemblies 100a, 100b, which may border or may encompass this space (or chamber) at least partially, wherein the sensor assemblies may oppose each other at least partially. The sensor assemblies 100a, 100b and/or the sensor elements 21, 22, which may be arranged on these mutually facing outer surfaces, may be arranged at this time such that at least one signal transmitter 21 of the first sensor assembly 100a may approximately oppose a signal receiver 22 of a second sensor assembly 100b, such that a signal emitted from the signal transmitter 21 can be sent through the surveillance space R to the signal receiver 22 of the second sensor assembly 100b and can be received. Such an arrangement can be implemented in space arbitrarily. FIG. 14b shows two vertically aligned sensor assemblies 100a, 100b, wherein here the signal S may be sent horizontally through a surveillance space R and may be received.

FIG. 15a shows, in a side view, an embodiment according to the invention of a sensor system 200 having an arrangement of two sensor assemblies 100a, 100b, wherein the sensor assemblies may be aligned opposingly relative to each other such that the sensor elements 20a and 20b arranged at the mutually opposing outer surfaces 14 and 12b can interact with each other, i.e. a signal S sent from a signal sensor element 20a can be received by a second sensor element 20b.

At this time, the sensor elements may be positioned and selected in terms of their type with respect to each other such that in the sensor assemblies 100a, 100b, at their outer surfaces 14a and 12b facing each other, always one signal transmitter 21 and one signal receiver 22, respectively, may be opposing each other (FIG. 15b). Further sensor elements may be arranged on the outer surfaces of the two sensor assemblies 100a, 100b, which may face away from each other, wherein the further sensor elements may be respectively complementary to the very sensor element, which may be located on the respective sensor assembly on the outer surface facing the other sensor assembly. In this context, the term "complementary" refers to the respective other type of a sensor element. In FIG. 15a, the sensor assembly 100a with its outer surface 14a having a signal transmitter 20a may be located facing the outer surface 12b of the sensor assembly 100b having a signal receiver 20b. Thus, the further sensor element 20c, which may be arranged on the outer surface 12a that does not face the sensor assembly 100b, may be embodied as a signal receiver. In the sensor assembly 100b, the further sensor element 20d may be formed as a signal transmitter on the outer surface 14b that may face away from the sensor assembly 100a. Accordingly, all sensor elements of different sensor assemblies of respectively one type of the devices may each be oriented in one direction OR, and namely all signal transmitters may be oriented in a first direction OR 21 and all signal receivers may be oriented in a second direction OR 22 (FIG. 15b).

FIG. 16 shows, in a side view, a sensor system 200 according to the invention having four sensor assemblies 100a-d, which may be arranged one over the other, in which the respective signal transmitters 21a-d may be oriented in a first direction OR 21 from the upper side downward, and all signal receivers 22a-d may be oriented in a second direction OR 22 from the lower side upwards. In this manner, it may be possible to efficiently arrange plural sensor assemblies that may be identical in construction, in a total sensor system, and to combine them with each other cascadedly (or in a cascading manner). At this time, sensor elements, which may act with each other, of at least two neighbouring sensor assemblies may be arranged on a common axis A.

FIG. 17 shows a sensor system 200 according to the invention, having three sensor assemblies 100a-c, which may be arranged over each other respectively, and which may have a plurality of sensor elements 20, respectively. The sensor elements of one type of the devices may again be oriented exclusively in a first direction OR 21 and in a second direction OR 22. The sensor elements, which may act with each other, of different sensor assemblies may all be located on a common axis A respectively. Between two respective facing sensor assemblies 100, there may be a surveillance space R (or monitoring area), respectively, having a plurality of signal elements of different sensor assemblies, which elements may act together at least pairwisely.

The surveillance spaces R can be subdivided in smaller partial sections TB, in that the control electronic 260 respectively may define groups and may assign these groups to the respective partial sections TB.

FIGS. 18a-c show schematically a storage device 300 having a sensor system 200. To this end, the storing device 300 may have a storage space (or storage chamber) R for receiving and/or a deposit space (or positioning area), for a storage good, which space may be at least partially bordered and/or enclosed by a delimitation element 310 (FIG. 18c) or by sections 321, 322 of a delimitation element 310 (FIG. 18b) or by two different delimitation elements 310a, 310b (FIG. 18a).

Figure 19:
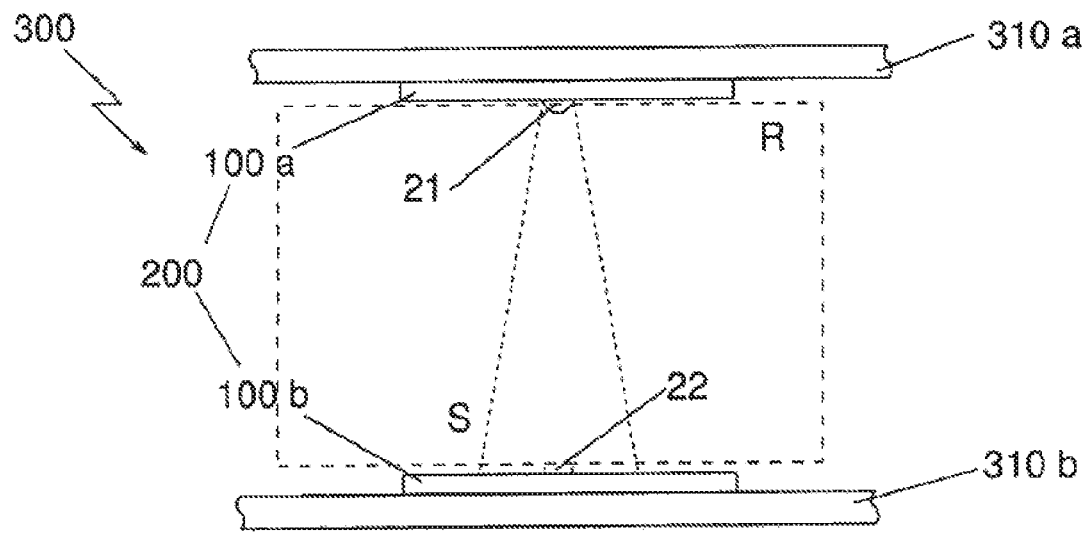
Figure 19:
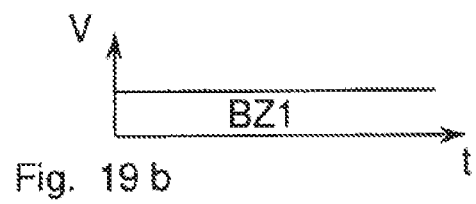
Figure 19:
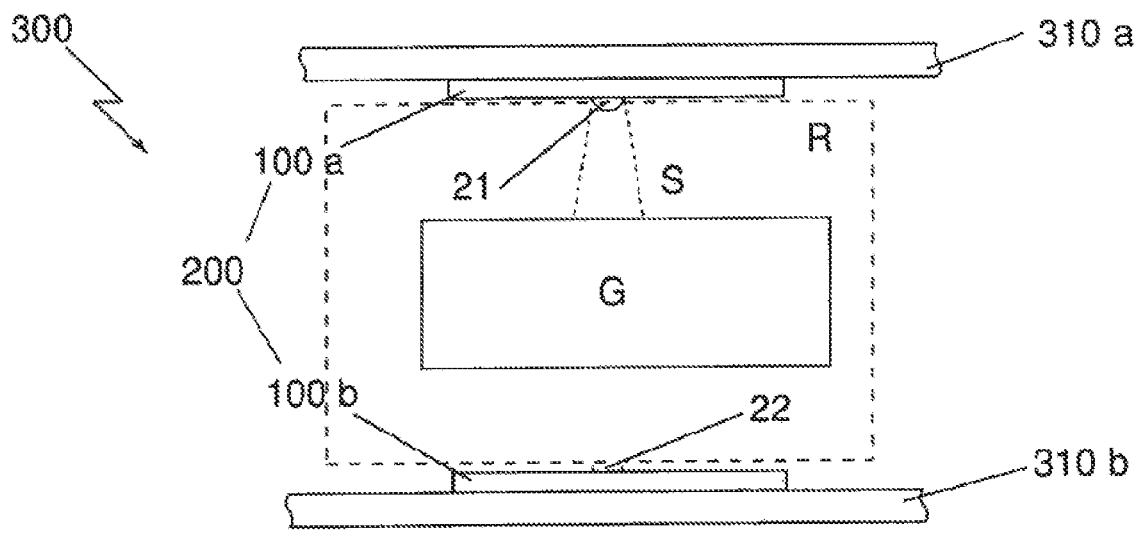
Figure 19:
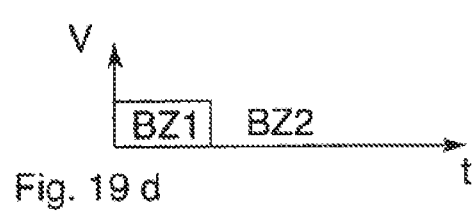

In an embodiment, for this purpose, a sensor system 200 having two different sensor assemblies 100a, 100b may be arranged on two delimitation elements 310a, 310b, such that at least one signal transmitter 21 of the first sensor assembly 100a can interact with at least one signal receiver 22 of the second sensor assembly 100b, wherein a signal S sent by the signal transmitter 21 may be sent through the surveillance space R to the signal receiver 22 (FIG. 19a). If no storage good blocks the path of the signal 5, then the signal receiver 22 may receive the signal S sent by the signal transmitter 21 and may interpret this as a first occupancy state BZ1, namely that no storage good may be contained in the surveillance space R (FIG. 19b).

However, if a storage good G is contained in the surveillance space R, the signal path S may be disturbed and a signal S sent by a signal transmitter 21 cannot be received by the signal receiver 22 (FIG. 19c), which may be interpreted as a second occupancy state BZ2, namely that a storage good may be present in the surveillance space R (FIG. 19d).

FIGS. 20a-c show different possibilities according to the invention of the arrangement of a sensor assembly 100 on a delimitation element 310. A sensor assembly 100 may be arranged either on an outer surface of a delimitation element 310, which surface may face the surveillance space R (FIG. 20a). A second possibility may be to arrange the sensor assembly 100 on an outer surface of a delimitation element 310, which surface may face away from the surveillance space R (FIG. 20b). A further possibility may be to integrate a sensor assembly 100 at least partially in a delimitation element 310 in an according recess 318 (FIG. 20c).

In an embodiment according to the invention for the arrangement of a sensor assembly 100 according to the FIGS. 20b and 20c, according to which the sensor assembly 100 and sensor elements 20 arranged therein would have no access to the surveillance space R and thus could send or receive no signals S, an opening may be introduced in the delimitation element 310 as a signal opening 315 for the passing through of signals of the sensor elements (FIG. 21a). This signal opening 315 can be either punched or drilled into the delimitation element 310, and may enable a sensor element 20 for an interaction with a complementary sensor element through the surveillance space R. FIG. 21a shows a sensor assembly, which may be arranged at a back side of a delimitation element 310 facing away from the surveillance space R, and which may have a signal opening 315 through the total strength (or thickness) of the delimitation element 310. In an integrated sensor assembly 100, there may be provided at least one signal opening 315 at at least one side or at least two signal openings 315 at both sides at the respective locations of the sensor elements 20 (FIG. 21b).

The sensor element 20 may protrude from the surface of the sensor assembly 100 and thus may fill such a signal opening 315 at least partially. At this time, the sensor assembly may be positioned and at least in an attempt fixed in relationship to the delimitation element, such that the at least one sensor element 20 may conic securely in coverage with the signal opening 315. In a further embodiment, the signal opening 315 may be filled at least partially with a material 316, which may be transparent for the type of signal used by the sensor elements, e.g. with a transparent synthetic resin. Thus, a smooth surface is present and no dirt, which would disturb the signals, can accumulate in the signal openings (FIG. 22a).

Alternatively or in addition, a further protective layer 316 may also be applied, e.g. a foil (or film) or an adhesive tape of a transparent material (FIG. 22b).

In one embodiment of the invention, for the arrangement of a sensor assembly 100, a device (FIG. 23a) or a receiving space 318 (FIG. 23b) may be arranged at a delimitation element 310.

FIG. 23a shows a device having an opening 317, into which a sensor assembly (not represented) can be pushed, and which may engage behind the device, such that the sensor assembly may be held securely at an outer surface. In the delimitation element 310, signal openings 315 corresponding to the surveillance space R may be introduced, such that the sensor elements of a sensor assembly (not represented) can send or receive signals.

FIG. 23b shows a recess, which is intended for the receiving of a sensor assembly (not represented), the recess being in the form of a cavity 318, which may be accessible from above. In a further embodiment, a sensor assembly 100 may be laid flushingly thereinto. Signal openings 315, which open downwardly, may be introduced in the cavity.

FIG. 24a shows a delimitation element 310 having a cavity 318, which may open upwardly 317, into which a sensor assembly 100 can be put into from above. FIG. 24b shows a delimitation element 310 having a cavity 318 which may open towards a side 317, and into which a sensor assembly 100 may be insertable.

FIG. 25 shows the lower side 14 of a plate-shaped delimitation element 310 having a placement side for storage goods located at the upper side and accordingly with a surveillance space, which may be lying at the upper side with respect to the gravity F, and on which plural sensor assemblies 100 may be arranged parallel to each other. The sensor assemblies 100 may be aligned on the delimitation element 310 according to the sensor elements 20 arranged on the outer surfaces such that the sensor elements 20 may come in coverage with the corresponding signal openings 315. The flexible sensor assemblies 100 may subsequently be fixed to the outer surface 14 of the delimitation element 310 with an adhesive layer present on one side [of the sensor assembly].

Each sensor assembly 100 may have a plurality of sensor elements 20, which may be arranged, respectively, in a row (or line) at the respective sensor assembly 100. Because plural sensor assemblies 100 may be arranged on the delimitation element 310, respectively, parallel to each other, there may result a sensor matrix (FIG. 26), which can be controlled and/or evaluated selectively also in partial areas, respectively, with a control electronics 260 (FIG. 27).

In an embodiment according to the invention, the delimitation elements 310, which may border or enclose a surveillance space, may have devices 325 (FIG. 28a) for receiving further delimitation elements 310 and/or separating elements 330 for the establishment of partial sections (or sub-sections) TB within a surveillance space R (FIG. 28b). For this purpose, the further delimitation elements 310 or separating elements 330 may be inserted (or slid-in) the devices 325 from above, such that an approximately rectangular corner, and in connection with the same procedure at the other end of the inserted delimitation element 310 or separating element 330, in total an isolated (or partitioned) partial section TB may be generated. In one embodiment, the devices 325 may have contact surfaces 326 at their sides (FIG. 28c), such that delimitation elements slid in there and the sensor assemblies contained therein may be connected electrically with the sensor system and/or the storage device. Furthermore, the delimitation elements 310 or the separating elements 330 may contain current lines and data lines 327, so as to integrate inserted elements in the power supply and data lines of the drawer (FIG. 28b), FIG. 29 shows in perspective a shelf 410 having sensor assemblies arranged at the lower side 14 and signal openings 315 passed through the supporting surface for storage goods. In addition, the shelf may be subdivided in plural shelf compartments by separating elements 330 extending parallel to the sensor assemblies. A frame, which may run around the shelf on all sides may prevent a lateral falling out of stored storage goods.

FIG. 30 shows a storage device formed as a shelf unit (or rack) 400 having a first shelf 410 for receiving storage goods as well as further shelves 410, wherein, due to the spatial arrangement relative to each other, a surveillance space R may be defined, respectively, between two shelves 410, wherein a plurality of sensor assemblies 100 may be arranged at the lower side 14 of the shelf 410 located above a surveillance space R.

FIG. 31b shows a section through a shelf unit 400 having in total three shelves 410 and two surveillance spaces R. The section cuts through a sensor assembly 100 arranged at the position (or height) of sensor elements 20 arranged on a line (FIG. 31a). At the lower side of each shelf 410, a sensor assembly 100 may be arranged, wherein the signal transmitters 21 may be oriented from the top downwardly (OR 21) and the signal receivers 22 may be arranged from the bottom upwardly (OR 22). At one side, the shelves may have a slope (or decline), which may make sure that the gap of (or left by) a withdrawn storage good G, e.g. a package with screws, may be closed by sliding-down packages, and that a package may always be available at the front at a withdrawal location as long as there are still packages in the corresponding goods shelf Packages that may be present in the storage shelf prevent the receiving of signals S that may be sent from the signal transmitters 21 arranged above the packages by the signal receivers 22 and may be obscured by the packages, so that a signal S, which may be sent but not received, may be interpreted as a first occupancy state and as "being present". At locations, where no package may be present any more, a signal S can be received, which may be interpreted as a second occupancy state and as "empty". The individual occupancy states may be prompted either periodically or due to an event, e.g. a manual request, and may be signalled to a superordinate management system, which may perform an inventory update on the basis of the storage location and/or the assignment of a surveillance space R and/or its partial sections to particular goods, and may trigger order transactions as the case may be.

FIG. 32 shows a cupboard 500 as a storage device having at least one drawer 501 and a surveillance space R contained in the interior space of the drawer.

The drawer 501 may be formed by a drawer bottom plate (or drawer base) as a supporting surface for storage goods and a frame formed of four side walls 510 running around the bottom plate. The side walls 510 may have fixing devices 325 for inserting further delimitation elements 310 as well as further separating elements 330. Sensor assemblies may be integrated in the delimitation elements 310 arranged transversely to the pulling-out direction and/or in the front sides and the back sides 510, wherein signal openings 315, respectively corresponding to the sensor elements, may be present at the outer surfaces pointing towards the surveillance space R. Also here, sensor elements of only one type of the devices may be oriented in only one direction parallel to the pull-out direction. A central plug connector 523 for the power supply 524 as well as for the data lines 524 may be arranged on a drawer 501, respectively, in the rear section. In the course of an opening (or pulling-out), the drawer 501 with the plug connector 523 may be pulled out of a counterpart arranged on the corpus of the cupboard 500, such that all electrical components may be without power supply. If necessary or desired, the drawer may be provided with an energy buffer storage in this case. In the course of a closing (or sliding-in), the drawer 501 with the plug connector 523 may slide into the counterpart on the corpus, and may establish again a connection to the power supply 525 as well as to the data lines 524. The closing may trigger a measurement of the individual occupancy states, and the data may be transmitted to a superordinate system 660 for an evaluation and/or for an inventory update (FIG. 33).

Also here, separating elements 330 make possible a sub-division of a drawer 501 and of the surveillance space R located therein into smaller partial sections TB and/or individual compartments (FIGS. 33 and 34a). By removable shelves, a respective partial section TB can be assigned to exactly one pair of sensor elements (FIGS. 34a and 34b).

FIG. 35 shows again on the basis of the example of a shelf 410 and on the basis of the sensor matrix, how surveillance spaces may be established in an embodiment according to the invention, which surveillance spaces may not only correspond to a sensor strip and may be arranged at a distance from one sensor element to the next, but that sensor elements, which may lie adjacently both in (the direction of) the depth and the width, can be switched together to logical shelves and can be patterned according to the actual sizes of goods to be stored therein, such that specific occupancy states can be generated in the system as a function of the size of the goods and can be inquired (or prompted) accordingly.

The FIGS. 29 to 31b show, as described above, a shelf 410, which is inclined from the front to the back. The shelf 410 may be subdivided into sections extending in the height direction by separating elements 330. In each section, pieces of a same piece goods may be arranged, e.g. a cardboard package with screws, wherein e.g. four cardboard packages can be arranged in one section. Due to the gravity, the cardboard packages may slide downwardly within the section and thus to the front, until a first cardboard package may about the front edge of the shelf 410.

A sensor assembly 100 may be assigned to each section, and it may be stored in the control electronics 16 and/or the control system 260 by technical programming measures, which piece goods G may be associated (or "married") with the corresponding sensor assembly 100. In other words, a piece goods G, e.g. a cardboard package with screws, may be assigned to each sensor assembly 100 (and thus to each section) by technical programming measures. In a first variant, the assignment may have been effected in that the sensor assembly 100 may receive a unique ID. In a second variant, this assignment may be effected in that the signal receivers 22 of the sensor assembly may have a distinct (or unique) ID.

In the control electronics 16 and/or the control system 260, furthermore, the footprint of each piece goods on the shelf 410 may be stored by technical programming measures, in particular the length of the piece goods G in the longitudinal direction of the section.

If the signal receivers 22 of a sensor assembly 100 each have an own ID, or if the signal receivers 22 of a sensor assembly 100 are read out cascadedly one after the other, it may be communicated the control electronics 16 and/or the control system 260 on the basis of the signals of the signal receivers 22, over which length the section, from the front edge of the shelf 410 (where the first cardboard package abuts) in the direction of the opposite edge, may be occupied with piece goods G. By the aid of the footprint of the piece goods G on the shelf G and/or the length of the piece goods G in the longitudinal direction of the section, the control electronics 16 and/or the control system 260 may calculate the number of pieces of the piece good in the section.

If it is known from the signals of the signal receivers 22, for example, that the first 30 cm of a section as measured from the front edge of the shelf 410 may be occupied (these signal receivers 220 receive no signal), and is known that a piece goods and/or a cardboard package may have a length of 15 cm in the longitudinal direction of the section, then the control electronics 16 and/or the control system 260 may calculate that two pieces of the piece goods may be arranged in the section.

A rack unit of the FIGS. 29-31b can be operated as follows:

Initially, the rack unit having the corresponding shelves 410 may be provided, and each shelf 410 may be subdivided in sections, preferably by separating elements 310. Pieces of the same piece goods may be arranged in each section. As has been described above, each section may be assigned to a piece goods, e.g. cardboard package with screws, in the control electronics 16 and/or in the control system 260 by technical programming measures. By receiving and evaluating signals of the signal receivers 22 in the control electronics 16 and/or in the control system 260, there may be obtained, how many pieces of the piece goods G may be arranged in the respective section.

It may further be stored in the control electronics 16 and/or in the control system 260 by technical programming measures, that in the case, where the number of pieces of the piece goods in a section may reach a pre-defined threshold, an ordering signal may be sent. In the present example, an ordering signal can be sent by the control electronics 16 and/or the control system 260, e.g. in the case that only one cardboard package may still be arranged in the section.

The sending of the ordering signal may be e.g. the sending of a mail or the sending of an SMS. The ordering signal can be sent to a person responsible for the repeat order or to an ordering system, which may instruct the order automatically. The ordering signal may comprise preferably information relating to the identification of the piece goods, e.g. an item number (or product code), information relating to the required number of pieces of the piece goods, and information relating to an identification of the shelf 410 and/or of the shelf unit 400, i.e. the device for storing piece goods, so as to enable an addressing of a repeat order of the piece goods by postal mail, i.e. to be able to indicate an address for the repeat order.

Such a shelf unit can thus be used by an operator with the described method as follows: The operator may assign a particular product (piece goods G) to the section between two separating elements 330, and may arrange a particular number of the products in the section. Furthermore, the operator may store a threshold value of pieces of the piece goods in the section, wherein upon reaching the threshold value a repeat order of the same piece goods is to be triggered, as well as a number of pieces of the piece goods, which is to be re-ordered in that case. If the operator subsequently withdraws pieces of the piece goods, i.e. products, from the section, the number of pieces present in the section may correspond to the stored threshold value for these products at a particular point in time, such that an ordering signal may be sent from the control electronics 16 and/or the control system 260, e.g. a mail containing information relating to the identification of the piece goods, e.g. an item number, information on the required number of pieces of the piece goods as well as information relating to the identification of the shelf 410 and/or of the shelf unit 400, i.e. the device for storing of piece goods, so as to enable an addressing of a repeat order of the piece goods for postal mail, i.e. to indicate an address for the repeat order.

In the following, further advantageous embodiments are described:

Preferably, there may be provided a sensor assembly, which may have a carrier element having at least two sensor elements, wherein the sensor elements may be arranged on different outer surfaces of the carrier element.

It is preferred that the carrier element may have an angled, preferably a triangular or a quadrangular, in particular a quadratic or rectangular, cross-section.

It is proposed that the carrier element may be formed angledly, circularly, cross-shapedly, y-shapedly, strip-shapedly, grid-shapedly, meander-shapedly and/or star-shapedly.

It is further proposed that the carrier element may be rigid, flexible or semi-flexible, or may have at least two rigid, flexible or semi-flexible sections, which may be connected to each other.

It is possible and is thus proposed that the carrier element may be constructed from a foil (or film), or of plural layers of same or different foils (or films) and/or materials.

Preferably, it can provided that the carrier element may be formed at least partially as a printed circuit board having conductor paths, or may have at least electrical conductor structures for an electrical contacting and/or transmission of the signals of the sensor elements and/or further electrical and/or electronic components and/or for a connection to a data bus and/or to a power supply and/or for a connection to at least one further sensor assembly.

It is further proposed that a sensor element may be formed respectively as a signal transmitting device (or signal transmitter) or as a signal receiving device (or a signal receiver It is preferable that a test signal transmitter may be associated to (or provided adjacent to) a signal receiver such that the signal receiver can detect directly or indirectly signals of the associated test signal transmitter.

Furthermore, it is proposed that at least first sensor elements of a first outer surface of the sensor assembly may be formed complementary to the at least second sensor element of a second outer surface of the sensor assembly, in particular that the first sensor element may be formed as a signal transmitter and the second sensor element may be formed as a signal receiver, or that the first sensor element may be formed as a signal receiver and the second sensor element may be formed as a signal transmitter.

In a further developed embodiment, it is proposed that at least two sensor elements may be formed complementary with respect to each other and may be arranged at respectively mutually opposing outer surfaces of the carrier element, in particular that a first sensor element may be formed on a first outer surface as a signal transmitter and the second sensor element may be formed on a second outer surface opposite to the first outer surface as a signal receiver, or that a first sensor element may be formed on a first outer surface as a signal receiver and the second sensor element may be formed on a second outer surface, opposite to the first outer surface, as a signal transmitter.

It is advantageous that the sensor elements may be arranged at least partially integrated on or in an outer surface of the carrier element.

Preferably, it can be provided that the signal, which may be emitted by at least one signal transmitter and received by at least one signal receiver, may be a magnetic signal, an electromagnetic signal, or an acoustic signal.

In a further developed embodiment, it is proposed that the signal transmitter may have at least an LED, an OLED or a piezo-crystal, or is formed of an array of [one of] these elements.

In particular, it is proposed, that IR light may be emitted from at least one signal transmitter.

Furthermore, it is proposed that at least one sensor element and/or at least one conductor path may be printed.

It is further proposed that a control electronics may be mounted on the carrier, wherein the control electronics may identify distinctly (or uniquely) the sensor assembly as opposed to other sensor assemblies.

It is further proposed that the control electronics may activate the sensor elements, and may register, further may process, and may transmit the data signals of the sensor elements.

In a further developed embodiment, it is proposed that the signal, which may be generated by the control electronics and emitted by the signal transmitter, may be variable in terms of its frequency and/or its intensity.

In a still further developed embodiment it is proposed that the emitted signal may be clocked (or synchronized) such that the signal may be coded.

It is further proposed that an operation state related to the sensor elements that may be present can be activated or inquired (or prompted) by the control electronics individually, group-wisely or all at once, in particular, that a signal transmitter may output a signal, or that a signal receiver may be inquired as to whether it receives a signal.

It is further proposed that the carrier element may have more than two, preferably a plurality of, sensor elements on at least one outer surface, which [sensor elements] may be arranged in a defined manner with respect to each other, preferably on at least one line or in at least one row.

In a further developed embodiment it is proposed that sensor elements for different types of signals may be grouped jointly, and/or are arranged alternatingly, on an outer surface of the carrier element.

In a still further developed embodiment it is proposed that only sensor elements of one type of the devices may, respectively, be arranged on one outer surface, in particular that the sensor elements arranged on an outer surface may be formed respectively only as signal transmitting devices or respectively only as signal receiving devices.

It may be provided advantageous that the signal transmitting devices and the signal receiving devices may be grouped jointly, and/or may be arranged alternatingly, on an outer surface of the carrier element.

It is further proposed that a marking may be present for a later positioning and/or alignment of the sensor assembly.

It is further proposed that a fixing device may be present for a later positioning and/or fixing of the sensor assembly.

It is further proposed that the carrier element may have an adhesion surface on at least one outer surface.

In a further developed embodiment, it can be provided that the adhesion surface may be covered at least temporally with a detachable covering foil (or film).

Further, advantageously, a sensor system for an occupancy detection with at least two sensor assemblies may be provided, wherein the sensor assemblies may be arranged in at least one position such that they may comprise at least partially a surveillance space, and such that an emitted signal of at least one signal transmitter of a first sensor assembly may be detectable in at least one occupancy state by at least one signal receiver of a second sensor assembly, so that a received signal may be interpreted as a first occupancy state, and a sent, but not received, signal may be interpreted as a second occupancy state.

In a further developed embodiment, it is proposed that the sensor assemblies may be arranged in at least one position relative to each other such that at least a respective one of their outer surfaces faces an other one at least partially, and that at least one sensor element may be arranged on each one of the at least partially facing outer surfaces, which sensor elements may, respectively, be complementary to each other, in particular that the at least first sensor element may be formed as a signal transmitting device and that the at least second sensor element may be formed as a signal receiving device, or that the at least first sensor element may be formed as a signal receiving device and that the at least second sensor element may be formed as a signal transmitting device.

It is further proposed that at least one further sensor element may be arranged for at least one of the sensor assemblies on at least one of the outer surface that may not face an other sensor assembly.

It is further proposed that at least one further sensor element may be arranged for at least one of the sensor assemblies on the outer surface that may face away from an other sensor assembly.

In a further developed embodiment, it is proposed that the at least one further sensor element may be complementary to the type of the at least one sensor element on the outer surface that may face the at least one other sensor assembly, in particular that the sensor element may be formed as a signal transmitting device and the sensor element may be formed as a signal receiving device, or that the sensor element may be formed as a signal receiving device and the sensor element may be formed as a signal transmitting device.

In a still further developed embodiment, it is proposed that, in relation to the arrangement of the at least two sensor assemblies, the sensor elements of respectively one type of the devices all may have the same orientation, in particular that all signal transmitting devices may be oriented in a first direction and all signal receiving devices may be oriented in a second direction.

It is possible and is therefore proposed that the first direction and the second direction may be oriented opposite to each other.

It is further proposed that at least two, preferably a plurality of, sensor elements may be arranged on an outer surface of a sensor assembly or of a section of a sensor assembly having a sensor element.

It is further proposed that the sensor elements of two neighbouring sensor assemblies may, respectively, be positioned approximately on a common axis.

It is further proposed that only sensor elements of one type may be arranged on the mutually facing outer surfaces of a sensor assembly or of a section of a sensor assembly having a sensor element, in particular that sensor elements arranged on a respective outer surface may be formed only as signal transmitting devices or only as signal receiving devices.

In a further developed embodiment, it is proposed that the sensor elements may be spaced at a distance to each other such that at least one pair of sensor elements may be present for a smallest unit to be measured, in particular that at least one signal transmitting device and at least one signal receiving device may be present, respectively, for a smallest unit to be measured, preferably that plural signal transmitting devices and plural signal receiving devices may be present for a smallest unit to be measured.

It is further proposed that a control electronics may coordinate pair-wisely or group-wisely (or in a pairwise manner or in a group-wise manner) sensor elements, which respectively may function complementary and act with each other, of the at least two sensor assemblies or of different sensor assemblies, in particular may synchronize [them] with each other, and in particular may control the transmission and the detection of signals.

In a further developed embodiment, it is proposed that the surveillance space may be subdivided into at least two partial sections (or sub-sections), wherein the partial sections may, respectively, be managed logically by the control electronics, wherein in particular at least one signal transmitter and one signal receiver or a group of sensor elements, which may function complementary and may act with each other, may be assigned to a first partial section, and at least one further signal transmitter and one further signal receiver or a group of further sensor elements, which may function complementary and may act with each other, may be assigned to a further partial section.

In a still further developed embodiment, it is proposed that the control electronics may evaluate the detected signals further, and may relay the signals and/or the determined occupancy states to a superordinate storing device or to a superordinate control unit on the basis a communication device.

Further, advantageously, there is provided a storing device for storing and managing storing good, in particular piece good and/or bulk good, wherein the device may have at least one surveillance space for the receiving of the storage good, and a sensor system.

It is proposed that the occupancy state and/or the degree of filling of the surveillance space may be monitored (or surveilled) by at least two approximately opposing sensor elements, wherein in at least one occupancy state an emitted signal S of at least one signal transmitter of a first sensor assembly may be detectable by at least one signal receiver of a second sensor assembly, such that a received signal can be interpreted as a first occupancy state, and a sent, but not received, signal or a dampedly received signal can be interpreted as a second occupancy state, wherein the combination of plural occupancy states can be interpreted as a degree of filling.

It is further proposed that the surveillance space may be at least partially defined (or delimited) by at least two delimitation elements or by at least two sections of a delimitation element, wherein the delimitation elements or the sections may approximately oppose each other at least partially, respectively, with at least one outer surface.

It is further proposed that at least one sensor assembly may be arranged, respectively, on a delimitation element, or, respectively, on a section.

Preferably, it can be provided that at least one sensor assembly may be arranged on an outer surface of a delimitation element, which outer surface may face the surveillance space.

In a further developed embodiment, it is proposed that at least one sensor assembly may be arranged on the outer surface of the respective delimitation element, which outer surface may face away from the surveillance space.

In a still further developed embodiment, it is proposed that at least one sensor assembly may be at least partially integrated in the respective delimitation element at least on one side of the surveillance space.

Advantageously, it can be provided that the delimitation element may have at least one signal opening, so that the at least one integrated sensor assembly or the at least one sensor assembly, which may be arranged on the outer surface facing away from the surveillance space, can send a signal to at least one further sensor assembly through the signal opening and/or can receive a signal from at least one further sensor assembly through the signal opening.

This embodiment may contribute relevantly to the possibility that sensor assemblies having sensors can be used on mutually opposing outer surfaces of a carrier, because, thereby, sensors of both sides can be involved in the process and can interact with other sensors. On the other hand, thereby, it may also be possible to save the half of the otherwise necessary sensor assemblies, because, with this embodiment, sensors may obtain access on two sides, and one side, respectively, may not be hindered by a usually impenetrable delimitation element, and/or otherwise only sensors, which may be populated (or equipped) on one side, may be used.

In a further developed embodiment, it can be provided that the signal opening may be filled up at least partially with a sensor element and/or that the signal opening may be at least partially covered and/or filled up with a material that may be penetrable for the signal.

It can further be provided that at least one delimitation element may have a device or a recess for an at least partial incorporation of at least one sensor assembly.

In particular, it can be further provided that the device or recess may have an opening for inserting a delimitation element on at least one outer surface.

Advantageously, it can be provided that at least one sensor assembly may be fixed to at least one delimitation element in a defined position with respect to a reference point of the storage device and/or of the delimitation element and/or of at least one further sensor assembly.

It is further proposed that at least one sensor assembly may be glued (or sticked) to at least one delimitation element.

It is further proposed that at least two, preferably a plurality of, sensor assemblies may be arranged approximately parallel to each other on a delimitation element, wherein the sensor elements that are arranged in a plane may form a sensor matrix.

It is possible and is therefore proposed that at least one separating element, preferably plural separating elements, may be arranged on, respectively, at least two delimitation elements, which may oppose each other and thus may be aligned approximately parallel to each other, wherein the separating elements may run transversely to the delimitation elements, such that at least two, preferably a plurality of, surveillance spaces may be formed.

In a further developed embodiment, it is proposed that at least one fixing device for at least one separating element may be present on at least one delimitation element on at least one outer surface.

In a still further developed embodiment, it is proposed that a plurality of fixing devices may be arranged on at least one side of a delimitation element, such that a variable sub-divisioning of the surveillance space may be possible.

It is further proposed that at least one signal transmitting device and one signal receiving device may be assigned to each surveillance space.

In particular, it is proposed that the storing device may be a shelf unit (or rack), and at least one first delimitation element may form a shelf.

It is further proposed that further delimitation elements, respectively, may form further shelf unit planes in the shelf unit, wherein the space between two respective shelf unit planes may form at least one surveillance space.

It is further proposed that the at least one sensor assembly may be arranged, according to the gravity, underneath the respective shelf of a shelf unit plane.

It is possible and is therefore proposed that sensor elements of different shelf unit planes may be aligned, respectively according to their respective position in the sensor assembly approximately on a common axis, wherein the axis may run vertically according to the gravity.

It is further proposed that sensor elements of different shelf unit planes may be oriented, respectively, according to their respective type, in only one direction, in particular that all signal transmitting devices of different planes may be oriented only in a first direction and that all signal receiving devices of different planes may be oriented only in a second direction.

In a further developed embodiment, it is proposed that all signal transmitting devices may, according to the gravitation, be oriented from the top to the bottom, and all signal receiving devices may be oriented oppositely from the bottom to the top.

It is further proposed that the shelf of respectively one shelf unit plane may have, in at least one direction, a slope (or an inclination) with respect to the horizontal plane in space.

In particular, it is proposed that the storage device may be a cupboard having at least one drawer, wherein at least two mutually opposing side walls of the drawer, as delimitation elements, at least partially may enclose a surveillance space.

In a still further developed embodiment, it is proposed that at least one sensor assembly may be integrated in at least one delimitation element forming a side wall.

It is possible and is therefore proposed that sensor elements of different delimitation elements may be oriented, respectively, according to their respective position on the sensor assembly approximately on a common axis, wherein the axis may run approximately horizontally and transverse to the gravitation F.

It is further proposed that sensor elements of different delimitation elements may be oriented, respectively, according to their respective type, in only one direction, in particular that all signal transmitting devices of different delimitation elements may be oriented only in a first direction and that all signal receiving devices of different delimitation elements may be oriented only in a second direction.

Preferably, it is proposed that all signal transmitting devices may be oriented from the backside wall to the frontside wall according to the pulling-out direction of the drawer, and that all signal receiving devices may be oriented oppositely from the frontside wall to the backside wall. Further, it is proposed that at least one further delimitation element, which may be arranged transverse to the pulling-out direction of the drawer, may be provided.

It is further proposed that at least one separating element, which may be arranged parallel to the pulling-out direction of the drawer, may be provided.

In a further developed embodiment, it is proposed that the drawer may have a drawer plug connector, which may connect the drawer at least in the closed state electrically to a power supply and/or to a data line in the corpus of the cupboard.

It is further proposed that a control unit may inquire at least one occupancy state of at least one surveillance space or of a part of a sub-divided surveillance space or of a partial section, and may evaluate the result and/or transmits this further to a superordinate management system.

It is further proposed that the control unit may manage logically at least respectively two co-operating sensor elements of at least two different sensor assemblies of the different at least subsets of co-operating sensor matrices, and thus may define a logical partial section, which may extend in a plane along an extension direction of a first sensor assembly and/or transversely to the extension direction of a first sensor assembly over at least one further sensor assembly arranged in parallel.

In a further developed embodiment, it is proposed that at least one partial section (or sub-section) may correspond to precisely one unit of a storage good to be stored.

In a still further developed embodiment, it is proposed that at least one logical partial section may correspond to at least one arrangement of delimitation elements and/or separating elements, in particular may correspond to the size of at least one partial section formed by delimitation elements and/or separating elements.

In a still further developed embodiment, it is proposed that the control unit, during an initialization process, may detect the partial sections on the basis of the arrangement of the delimitation elements and/or the separating elements among each other, and correspondingly may define the surveillance space into its logical partial sections, and may store [them] in the management system.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE NUMERALS 100 sensor assembly
10 carrier element
11 outer surface
12 outer surface
13 outer surface
14 outer surface
15 conductor path
16 control electronics
20 sensor element
21 signal transmitting device (or signal transmitter)
22 signal receiving device (or signal receiver)
23 electric/electronic components
24 data bus
25 power supply
26 test signal transmitting device
30 adhesion surface
31 covering foil
32 protective layer/protective foil
40 marking/fixation
200 sensor system
260 control electronics
270 communication device
300 storage device
310 delimitation element
311a, b, c, d, e, f outer surfaces of the delimitation element
315 signal opening for conveying signals
316 protective layer
317 insertion opening
318 recess (or cavity)
321 section of the delimitation element
322 section of the delimitation element 325 fixing device for separating element
326 contact fixing device
327 power line and data line
330 separating element
331 contact
360 control unit
400 shelf unit (or rack)
410 shelf (or floor sheet)
500 cupboard
501 drawer
510a, b, c, d side walls
523 drawer plug connector
524 data bus
525 power supply
660 management system
A axis
B reference point
BZ occupancy state
E plane
F gravitation (or gravity)
G storage good/piece good
OR orientation direction
R surveillance space (or monitoring area)
S signal
TB partial section

The invention claimed is:

1. Device for storing piece goods having at least an upper shelf and a lower shelf, the lower shelf has an upper side, on which the piece goods are storable in a surveillance space, and the upper shelf has a lower side and openings, which run from the upper side to the lower side, and the upper shelf has signal transmitting devices and signal receiving devices, wherein either the signal transmitting devices are associated to further signal receiving devices of the lower shelf, or the signal receiving devices are associated to further signal transmitting devices of the lower shelf, wherein a signal of the signal transmitting devices is detectable by the further signal receiving devices and a signal of the further signal transmitting devices is detectable by the signal receiving devices, wherein the shelves further has a control electronics having a control system, which energize the signal transmitting devices and the signal receiving devices and process signals of the signal receiving devices and identify them, so as to identify an occupancy state-of the surveillance space with piece goods on the basis of the existence of a signal at the respective signal receiving device; and
   wherein at least one signal transmitting device and at least one signal receiving device are arranged together in a respective one of the openings in the lower side of the upper shelf.

2. Device according to claim 1, characterized in that the piece goods comprise cardboard packages, aerosol cans, cases, storage boxes and tool boxes.

3. Device according to claim characterized in that the shelves are inclined, i.e. run at an angle to a horizontal direction.

4. Device according to claim 1, characterized in that a protection layer, e.g. a foil, which is transparent for signals, is arranged on the upper side of the lower shelf, so as to protect openings at the upper side of the lower shelf.

5. Device according to claim 1, characterized in that the signal transmitting devices or the signal receiving devices of openings of a section of the upper shelf are combined to a sensor assembly, so as to monitor this section with this one sensor assembly.

6. Device according to claim 5, characterized in that a row of openings, which are arranged linearly one behind the other, forms the section.

7. Device according to claim 6, characterized in that the row of openings extends from a deepest point of the upper shelf to a highest point of the upper shelf, in particular linearly and on a shortest path, and the signal transmitting devices and/or the signal receiving devices of the openings are combined to a sensor assembly, in particular so as to assign to the sensor assembly in the control system a particular piece goods, e.g. a particular cardboard package or aerosol can.

8. Device according to claim 7, characterized in that a footprint of the respective piece goods on the lower shelf is stored in the control system, such that the control system is capable to calculate the number of same pieces of the piece goods lower on the shelf along the sensor assembly on the basis of the signals of the signal receiving devices of the sensor assembly and the footprint of the individual piece goods.

9. Method for operating a device according to claim 1, the method having:
   a. providing the upper and lower shelves;
   b. subdividing the shelves into sections;
   c. arranging pieces of a same piece goods in a same section;
   d. establishing a correlation in the control electronics and/or in the control system, which piece goods are arranged in which section of the lower shelf; and
   e. evaluating signals of signal receiving devices of the section, so as to determine the number of pieces of the piece goods in the section.

10. Method according to claim 9, characterized by storing in the control system a footprint of the respective piece goods on the lower shelf, such that the control system can calculate the number of same pieces of the piece goods on the lower shelf along the sensor assembly on the basis of the signals of the signal receiving devices of the sensor assembly and the footprint of the individual piece goods.

11. Method according to claim characterized by outputting an ordering signal by the control system to a person and/or an ordering system, if the number of the same pieces of a piece goods in a section has a pre-defined threshold value.

12. Method according to claim 11, characterized in that the outputting of the ordering signal comprises the sending of a mail, an SMS or an MMS.

13. Method according to claim characterized in that the outputting comprises a transmitting of information relating to an identification of the piece goods, e.g. an item number, information relating to the required number of pieces of the piece goods as well as an information relating to an identification of the lower shelf and/or relating to the device for storing piece goods for addressing an additional delivery of the piece goods.

14. Method according to claim 9, characterized by an arranging of the upper and lower shelves in an inclined manner, such that pieces of the same piece goods in the respective section slide to the lower end of the lower shelf by the gravitation.

15. Method according to claim 9, characterized by arranging separating elements between neighbouring sections of the lower shelf.

* * * * *

UNITED STATES PATENT AND TRADEMARK OFFICE
CERTIFICATE OF CORRECTION

PATENT NO. : 10,952,551 B2  
APPLICATION NO. : 16/080640  
DATED : March 23, 2021  
INVENTOR(S) : Wittig Page 1 of 1

It is certified that error appears in the above-identified patent and that said Letters Patent is hereby corrected as shown below:

In the Claims

Column 21, Line 44, Claim 1      Delete "state-of", insert --state of--

Column 21, Line 54, Claim 3      After "according to claim", insert --1,--

Column 22, Line 40, Claim 11      After "according to claim", insert --9,--

Column 22, Line 48, Claim 13      After "according to claim", insert --9,--

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*